(12) United States Patent
Zhao et al.

(10) Patent No.: US 10,868,587 B2
(45) Date of Patent: Dec. 15, 2020

(54) WIRELESS COMMUNICATION METHOD AND WIRELESS COMMUNICATION DEVICE

(71) Applicant: Sony Corporation, Tokyo (JP)

(72) Inventors: Peiyao Zhao, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/327,853

(22) PCT Filed: Aug. 22, 2017

(86) PCT No.: PCT/CN2017/098405
§ 371 (c)(1),
(2) Date: Feb. 25, 2019

(87) PCT Pub. No.: WO2018/059161
PCT Pub. Date: Apr. 5, 2018

(65) Prior Publication Data
US 2019/0199410 A1   Jun. 27, 2019

(30) Foreign Application Priority Data
Sep. 30, 2016 (CN) .......................... 2016 1 0871759

(51) Int. Cl.
*H04B 7/0413* (2017.01)
*H04B 7/06* (2006.01)
(Continued)

(52) U.S. Cl.
CPC ......... *H04B 7/0413* (2013.01); *H04B 7/0456* (2013.01); *H04B 7/06* (2013.01);
(Continued)

(58) Field of Classification Search
CPC ................................ H04B 7/0413; H04B 7/06
(Continued)

(56) References Cited

U.S. PATENT DOCUMENTS

| 2015/0043673 A1* | 2/2015 | Lee ...................... H04B 7/0632 375/267 |
| 2015/0311962 A1* | 10/2015 | Maltsev ............... H04B 7/0689 375/267 |
| 2016/0065279 A1* | 3/2016 | Wang .................. H04B 7/0456 375/267 |

FOREIGN PATENT DOCUMENTS

CN            105612780 A       5/2016

OTHER PUBLICATIONS

International Search Report dated Nov. 16, 2017 for PCT/CN2017/098405 filed on Aug. 22, 2017, 10 pages including English Translation.

* cited by examiner

*Primary Examiner* — Wednel Cadeau
(74) *Attorney, Agent, or Firm* — Xsensus LLP

(57) ABSTRACT

An electronic device for a first communication device equipped with a plurality of antennas of a wireless communication system includes a processing circuit configured to configure a first transmission from the first communication device to a second communication device based on a plurality of sets of first sub-configuration parameters separately, so that a specific set of first sub-configuration parameters are determined based on information related to the first transmission; configure a second transmission from the first communication device to a second communication device based on a plurality of sets of second sub-configuration parameters separately; and configure a subsequent transmission from the first communication device to a second communication device based on a specific set of first con- (Continued)

figuration parameters which are determined based on combination of the specific set of first sub-configuration parameters and the specific set of second sub-configuration parameters.

20 Claims, 13 Drawing Sheets

(51) Int. Cl.
    *H04B 7/0456*      (2017.01)
    *H04B 7/08*      (2006.01)
    *H04W 24/08*      (2009.01)

(52) U.S. Cl.
    CPC ......... *H04B 7/0678* (2013.01); *H04B 7/0695* (2013.01); *H04B 7/088* (2013.01); *H04W 24/08* (2013.01)

(58) Field of Classification Search
    USPC .......................................................... 375/267
    See application file for complete search history.

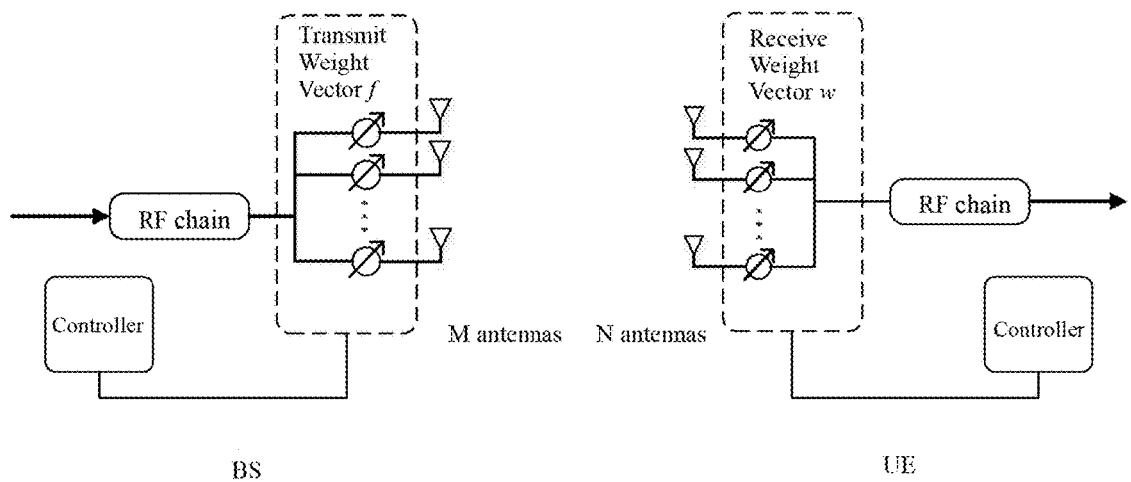
Fig.4a                     Fig.4b
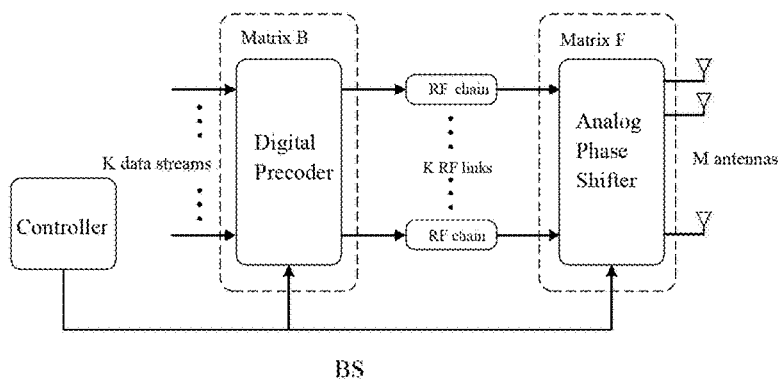
Fig.5a
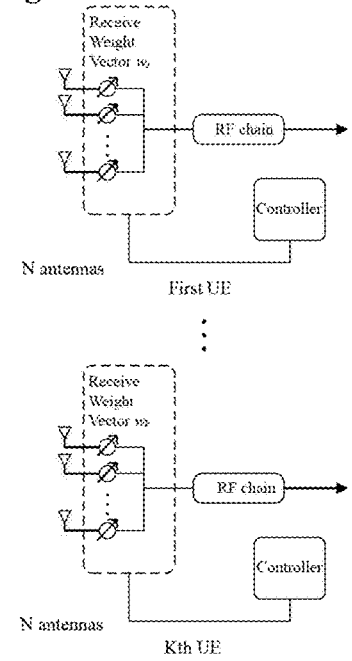
Fig.5b

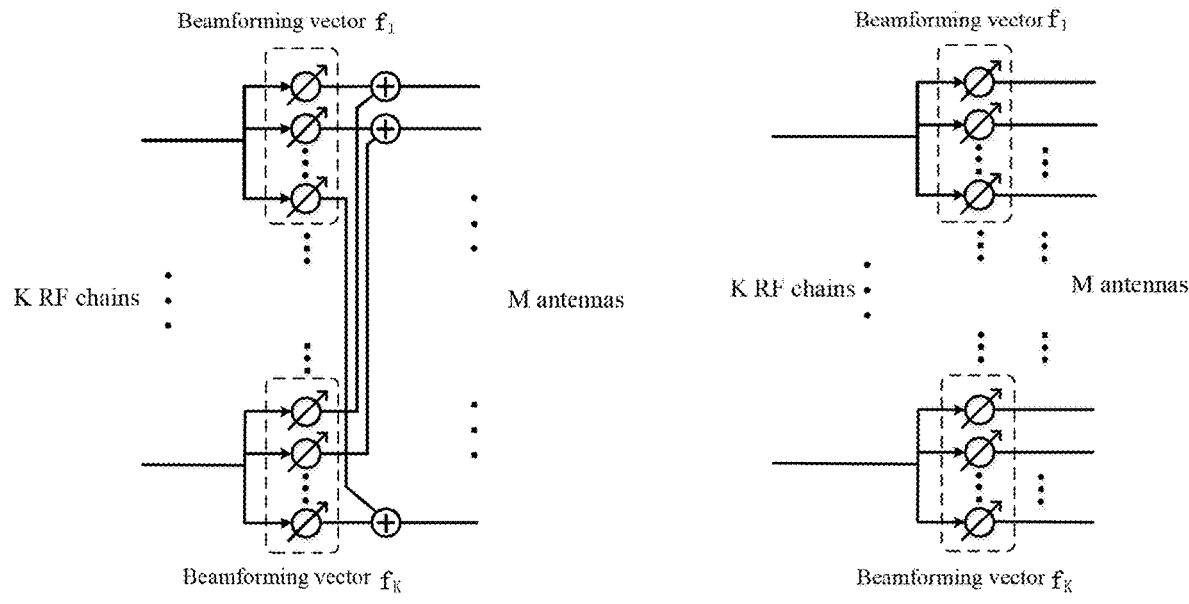
Fig.6a　　　　　　　　Fig.6b
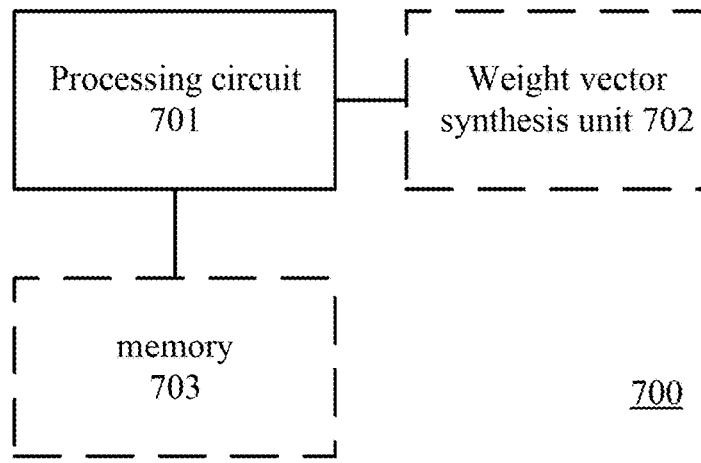
Fig.7a

WIRELESS COMMUNICATION METHOD AND WIRELESS COMMUNICATION DEVICE

CROSS-REFERENCE TO RELATED APPLICATIONS

The present application is based on PCT filing PCT/CN2017/098405, filed Aug. 22, 2017, which claims priority to 201610871759.6 filed Sep. 30, 2016, the entire contents of which are incorporated herein by reference.

FIELD OF THE INVENTION

The present disclosure relates to a wireless communication method and a wireless communication device, and more particularly, the present disclosure relates to a wireless communication method and a wireless communication device for a Massive Multi-Input Multi-Output (MIMO) communication system.

BACKGROUND

Recently, Massive Multi-Input Multi-Output (MIMO) technique and Millimeter Wave technique have been considered as a part of critical 5G technology in the future and have attracted wide attention from academia and industry. In particular, the Millimeter Wave band has a large amount of available spectrum resources to meet the graving traffic demands of mobile communications. In addition, due to short wavelength of the millimeter wave, according to related antenna theory, the antenna size of the millimeter wave system is small, so that hundreds or even thousands of antennas can be arranged in a small space, which is more advantageous for usage of the large-scale antenna technology in a real system. In addition, the beamforming technology provided by the large-scale antennas can effectively compensate for the shortcomings of millimeter-wave channel paths fading excessively, which makes it possible to apply the millimeter-wave technology to mobile communications.

Full Dimension Multiple Output Multiple Output (Full Dimension MIMO, FD-MIMO) technology is also one of hot spots attracting attention from the industry. By deploying a two-dimensional planar antenna array, FD-MIMO can provide both horizontal and vertical degrees of freedom. Compared with traditional linear antenna arrays, FD-MIMO can deploy more antennas in a limited space, which improves the performance of spatial diversity and multiplexing. However, how to perform beamforming transmission efficiently by both sides of the communication in the massive MIMO, especially FD-MIMO scenarios, has become a research focus of the industry.

DISCLOSURE OF THE INVENTION

The inventors of the present invention have found that the overhead of the existing beamforming training mechanism is still huge when the base station is equipped with large-scale antennas, especially a multi-dimensional antenna array. Further, in a case that both the user equipment and the base station are equipped with multiple antennas, the larger the number of antennas and the number of user equipments are, the larger the overhead for beamforming training becomes. Moreover, when there are multiple user equipments, it is necessary to determine, for each user equipment, corresponding beamforming parameters for transmission, and for this, the problem of overhead for beamforming training is more obvious.

However, there are currently no solutions feasible to solve these problems.

Accordingly, it is an object of the present invention to provide an improved technique for beamforming, particularly for the wireless communication.

In view of this, the present application proposes an improved beamforming training technique, the basic idea of which is to decompose configuration parameters to be determined (for example, configuration parameters about a phase shifter corresponding to an antenna, such as a weight vector) into several sub-configuration parameters and determine the sub-configuration parameters by corresponding training respectively, and thus the optimal sub-configuration parameters respectively obtained by training can be used for configuration. In one implementation, for a case of a two-dimensional antenna array, horizontal direction beam training and vertical direction beam training may be separately performed to obtain optimal horizontal direction sub-configuration parameters and optimal vertical direction sub-configuration parameters, respectively, and based on the optimal horizontal direction and vertical direction sub-configuration parameters respectively obtained, phase shifters corresponding to the antennas are configured, for example, the phase shifters can be configured based on Kronecker products of the horizontal direction and vertical direction sub-configuration parameters.

According to one aspect of the present invention, there provides an electronic device for a first communication device of a wireless communication system, wherein the first communication device equipped with a plurality of antennas, and the electronic device comprises a processing circuit configured to configure a first transmission from the first communication device to a second communication device based on a plurality of sets of first sub-configuration parameters separately, so that a specific set of first sub-configuration parameters are determined based on information related to the first transmission, wherein the plurality of sets of first sub-configuration parameters are associated with a first direction with respect to a plane in which the plurality of antennas are located; configure a second transmission from the first communication device to the second communication device based on a plurality of sets of second sub-configuration parameters separately, so that a specific set of second sub-configuration parameters are determined based on information related to the second transmission, wherein the plurality of sets of second sub-configuration parameters are associated with a second direction with respect to the plane, the second direction being orthogonal to the first direction; and configure a subsequent transmission from the first communication device to the second communication device based on a specific set of first configuration parameters which are determined based on combination of the specific set of first sub-configuration parameters and the specific set of second sub-configuration parameters.

According to another aspect, there provides an electronic device for a second communication device of a wireless communication system, the electronic device comprising a processing circuit configured to acquire information related to a first transmission configured by a first communication device based on a plurality of sets of first sub-configuration parameters separately, wherein the plurality of sets of first sub-configuration parameters are associated with a first direction with respect to a plane in which the plurality of antennas are located, and acquire information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction; wherein a specific set of first sub-configuration parameters determined based on the information related to the first transmission and a specific set of second sub-configuration parameters determined based on the information related to the second transmission are used for determining a specific set of first configuration parameters configuring a subsequent transmission from the first communication device to the second communication device.

According to yet another aspect of the present invention, there provides a method for a wireless communication system, wherein the wireless communication system comprises a first communication device and a second communication device, and the first communication device is equipped with a plurality of antennas. The method comprises configuring a first transmission from the first communication device to a second communication device based on a plurality of sets of first sub-configuration parameters separately, so that a specific set of first sub-configuration parameters are determined based on information related to the first transmission, wherein the plurality of sets of first sub-configuration parameters are associated with a first direction with respect to a plane in which the plurality of antennas are located; configuring a second transmission from the first communication device to the second communication device based on a plurality of sets of second sub-configuration parameters separately, so that a specific set of second sub-configuration parameters are determined based on information related to the second transmission, wherein the plurality of sets of second sub-configuration parameters are associated with a second direction with respect to the plane, the second direction being orthogonal to the first direction; and configuring a subsequent transmission from the first communication device to the second communication device based on a specific set of first configuration parameters which are determined based on combination of the specific set of first sub-configuration parameters and the specific set of second sub-configuration parameters.

According to still another aspect, there provides a method for a wireless communication system, wherein the wireless communication system comprises a first communication device and a second communication device, and the first communication device is equipped with a plurality of antennas. The method comprises acquiring information related to a first transmission configured by a first communication device based on a plurality of sets of first sub-configuration parameters separately, wherein the plurality of sets of first sub-configuration parameters are associated with a first direction with respect to a plane in which the plurality of antennas are located; and acquiring information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction, wherein a specific set of first sub-configuration parameters determined based on the information related to the first transmission and a specific set of second sub-configuration parameters determined based on the information related to the second transmission are used for determining a specific set of first configuration parameters configuring a subsequent transmission from the first communication device to the second communication device.

According to embodiments of the present invention, the overhead for beamforming training in wireless communication can be reduced.

According to embodiments of the present invention, the signaling overhead can be further reduced while keeping the beamforming training overhead low.

Other features and advantages of the present invention will become apparent from the following detailed description of exemplary embodiments of the present disclosure with reference to the accompanying drawings.

DESCRIPTION OF THE DRAWINGS

The accompanying drawings, which are incorporated in and constitute a part of this specification, illustrate embodiments of the present disclosure and, together with the description, serve to explain the principles of the present disclosure.

The present disclosure will be more clearly understood from the following detailed description with reference to the accompanying drawings, in which;

FIGS. 4a and 4b are diagrams showing configurations of a base station and a user equipment in a single-user system, respectively.

FIGS. 5a and 5b are diagrams showing configurations of a base station and a user equipment in an analog-digital hybrid precoding architecture, respectively.

FIGS. 6a and 6b show schematic diagrams of a full-connection phase shifting network and a sub-connection phase shifting network, respectively.

FIG. 7a shows a schematic diagram of an electronic device for a communication device in a wireless communication system, in accordance with one embodiment of the present invention.

DETAILED DESCRIPTION OF PREFERRED EMBODIMENTS

Figure 1:
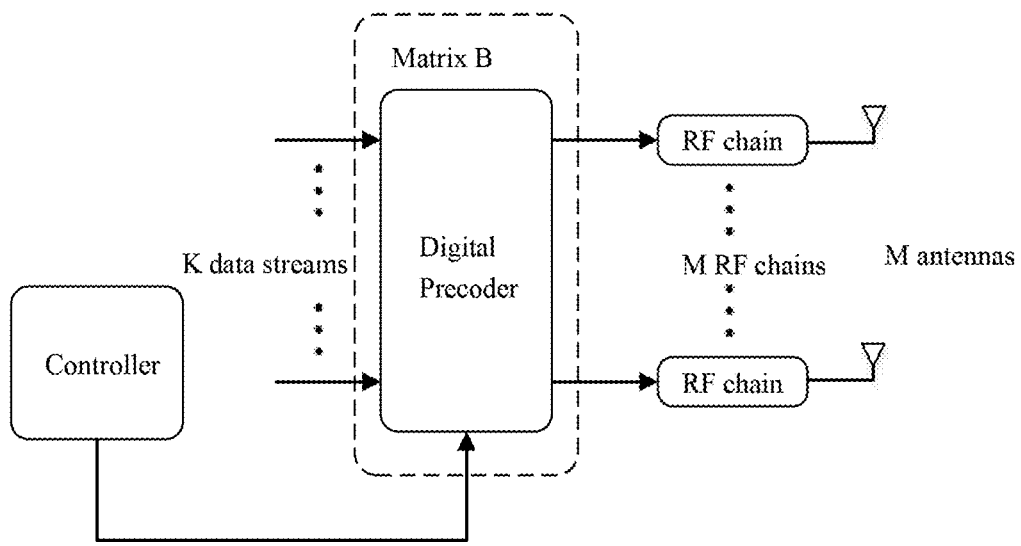
FIG. 1 is a diagram showing the structure of a prior art base station (BS).

Various exemplary embodiments of the present disclosure will now be described in detail with reference to the accompanying drawings. Notice that, unless otherwise specified, relative arrangement, numerical expressions and numerical values of components and steps set forth in these examples do not limit the scope of the invention.

Meanwhile, it should be understood that, for ease of description, dimensions of various parts shown in the drawings are not drawn in actual proportions.

The following description of at least one exemplary embodiment is in fact merely illustrative and is in no way intended to limit the invention, its application or use.

Techniques, methods, and apparatus known to those of ordinary skill in the relevant art may not be discussed in detail, but where appropriate, these techniques, methods, and apparatuses should be considered as part of the specification.

In all the examples shown and discussed herein, any specific value should be construed as merely illustrative and not as a limitation. Thus, other examples of exemplary embodiments may have different values.

Note that, similar reference numerals and letters denote similar terms in the accompanying drawings, and therefore, once an item is defined in a drawing, there is no need for further discussion in the accompanying drawings.

In a conventional wireless communication system, usually, at a transmitting end (for example, a base station) and a receiving end (for example, a user equipment), each antenna is connected to one radio frequency (RF) chain for transmission and reception. Generally speaking, in operation, at the transmitting end, a data stream to be transmitted is first subjected to baseband processing, and then converted into a radio frequency signal via a radio frequency chain so as to be transmitted through a corresponding antenna, and the corresponding radio frequency chain at the receiving end receives the radio frequency signal and processes it into a baseband signal, and then the baseband signal is further subject to baseband processing to obtain the desired data stream.

Generally, in the baseband data processing, in order to facilitate data transmission via a radio frequency chain and a corresponding antenna, a digital preceding architecture is mainly used, in which each antenna is connected to one radio frequency chain, and respective magnitudes of signals transmitted over respective radio frequency chains each can be adjusted, to reduce interference between multiple channels of data signals carried on the same transmission resource. Such processing before data being transmitted via the radio frequency chain and antenna may be referred to as baseband digital processing for the data at the transmitting end.

For example, FIG. 1 schematically illustrates a conceptual structure of a prior art base station. As shown in FIG. 1, in a digital precoding architecture, the base station is equipped with M antennas (M is an integer and M≥1), and each antenna is arranged with a corresponding radio frequency chain. Under the control of the controller, the digital precoder obtains a K-way data stream (K is an integer and K≥1), digitally pre-codes the K-way data stream (for example, causing the K-way data stream to pass through a digital precoding matrix B of a size of M×K). The encoded data is transmitted to one or more user equipments via the radio frequency chains and the antennas.

Correspondingly, the user equipment can have a variety of configurations, so as to perform corresponding baseband digital processing after receiving the encoded data over the radio frequency chains to obtain the desired data stream.

Figure 2:
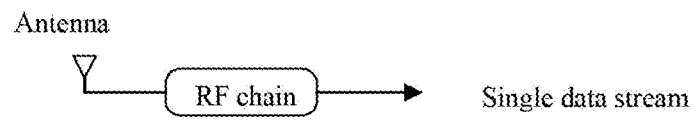
FIG. 2 is a diagram showing a user equipment (UE) equipped with a single antenna.

FIG. 2 shows a user equipment equipped with a single antenna. As shown in FIG. 2, the UE is equipped with a single antenna and a corresponding single RF chain. Since the user equipment has only one antenna, it can only receive a single data stream. That is to say, in the K-way data stream sent from the M antennas of the base station, only one data stream can be received by the UE by means of a corresponding digital processing.

Figure 3:
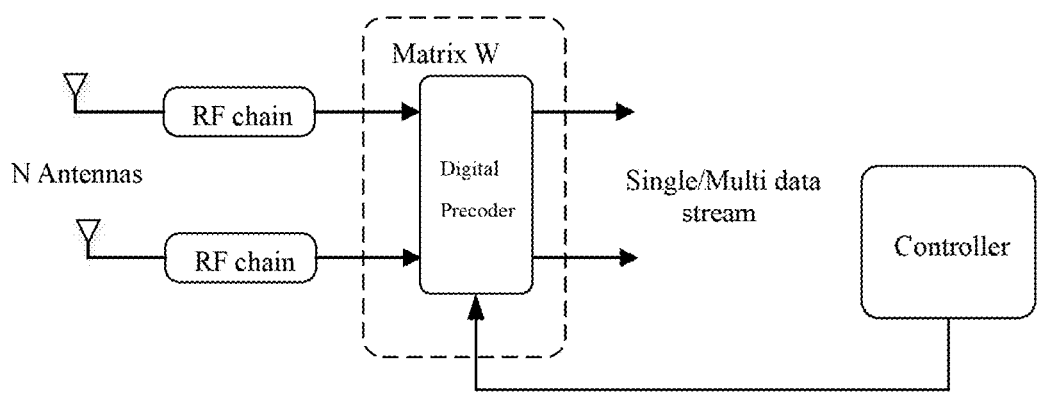
FIG. 3 is a diagram showing a user equipment equipped with a plurality of antennas.

FIG. 5 shows a user equipment equipped with multiple antennas. As shown in FIG. 3, the UE is equipped with N antennas (N is an integer and N>1). Each antenna transmits the received data to the digital precoder via a corresponding radio frequency chain. Under the control of the controller, the digital precoder performs digital precoding on the received data by using, for example, a digital precoding matrix W of a size Ku×N (Ku is an integer and Ku≥1), thereby obtaining a single path data (Ku=1) or multiplexed data (Ku>1).

For the digital precoding matrix used in the digital precoder, there usually exists two design ways: a codebook-based way and a non-codebook based way. In a codebook-based design, the digital precoding matrix must be selected from preset codebooks. In a non-codebook based design, there is no such constraint. The base station and the UE can design the precoding matrixes according to Channel State Information (CSI).

The above digital precoding process can be considered as belonging to the baseband digital processing portion in the wireless communication.

Further, in a wireless communication system, especially a millimeter wave communication system, when pre-digitally processed data is transmitted through a radio frequency circuit and a corresponding antenna, due to high complexity of implementation and high cost of the radio frequency chain, usually every RF chain is connected to a plurality of phase shifters and antennas so that directional beams can be formed by using as few as one RF chain, thereby implementing an analog beamforming scheme. Analog beamforming training refers to a process of optimizing configuration information of a base station and a user equipment (for example, configuration values of phase shifters related to the base station and the user equipment, also referred to as weight vectors for the phase shifters), and mainly functions as improving the signal to noise ratio for user equipment receiving signals. Taking the downlink as an example, a base station forms directional transmit beams by configuring values of a plurality of phase shifters connected to plurality of antennas thereof, and the user equipment forms directional receive beams by configuring values of a plurality of phase shifters connected to the plurality of antennas thereof. A transmit beam of the base station and a receive beam of the user equipment forms a beam pair for the downlink. The process of downlink beamforming training is a process which aims to find an optional beam pair consisting of an optimal transmit beam of the base station and an optimal receive beam of the user equipment. Similarly, in the uplink, a receive beam of the base station and a transmit beam of the user equipment also form a beam pair.

A Millimeter wave communication system has multiple modes of operation, such as a point-to-point mode, a single-user mode, a multi-user mode, and the like. The point-to-point mode can be used for backhaul among base stations, the single-user mode and multi-user mode can be used for communication between a base station and one or more user equipments. With respect to implementation architecture, analog beamforming, full-connection analog-digital hybrid precoding, sub-connection analog-digital hybrid precoding, and the like can be included. However, no matter which architecture is adopted, the configuration information of the base station and the user equipment (for example, the configuration values of the phase shifters involving the base station and the user equipment) can be only selected from predefined simulation codebooks (模拟码本), due to limitation from constraints for the device. The configuration information usually may be referred to as weight vectors, which generally refer to configuration values (e.g., phase values) of the phase shifters.

Such processing is mainly performed at respective radio frequency portions of a transmitting end and a receiving end of a wireless communication system, and can be considered as radio frequency analog processing.

The concept of beamforming technique will be exemplarily described below with reference to figures.

FIGS. 4a and 4b show configurations of a base station and a user equipment in a single-user system, respectively. As shown in FIG. 4a and FIG. 4b, in the user equipment and the base station, each radio frequency chain is connected with a set of phase shifters, and each phase shifter is connected to a corresponding antenna. The values of a set of phase shifters (e.g., phase values) may be indicated by a set of configuration parameters, such as DFT vectors, also referred to as weight vectors or beam vectors. Herein, we denote the weight vector of the base station as f and the weight vector of the user equipment as w. Since a phase shifter only adjusts the phase of signal without changing its magnitude, the magnitude of each element in the weight vector is one. In a millimeter wave communication system of this structure, since the number of radio frequency chains is limited, the base station and the user equipment cannot directly estimate the channel state information. Therefore, a common analog beamforming scheme uses a method based on analog Tx/Rx codebooks. A codebook is a collection of weight vectors. Let a codebook for the base station be F, with a size of P (including P weight vectors), the codebook for the user equipment be W, with a size of Q (including Q weight vectors), then the weight vector of the base station must be selected from the codebook F for the base station, the weight vector of the user equipment must be selected from the codebook W for the user equipment.

In millimeter wave communication between the base station and the user equipment, a weight vector in the codebook which is to be particularly employed shall be determined by beam training in advance. The beam training, for example, may employ a maximum signal-to-noise (SNR) ratio criterion to determine weight vectors used to form optimal beams, which may be expressed as:

$$\{w_{opt}, f_{opt}\} = \arg\max |w^T H f| \text{ wherein } w \in W, f \in F$$

Where $H \in \mathbb{C}^{N \times M}$ represents a downlink channel between the base station and the UE, W is a candidate set (codebook) for the weight vector of the UE, and F is a candidate set (codebook) for the weight vectors of the base station, and $w_{opt}, f_{opt}$ are the determined optimal weight vector of the UE and of the base station, respectively.

Due to large attenuation in a millimeter-wave channel path, the millimeter-wave multipath channel has a small number of scatters, and a millimeter-wave channel H can usually be modeled as:

$$H = \sqrt{\frac{MN}{N_{cl} N_{ray}}} \sum_{i=1}^{N_{cl}} \sum_{l=1}^{N_{ray}} \alpha_{i,l} a_{UE}(\theta_{i,l}^{UE}, \phi_{i,l}^{UE}) a_{BS}^H(\theta_{i,l}^{BS}, \phi_{i,l}^{BS})$$

Where N and M respectively represent the number of antennas equipped by the UE and the base station, $N_{cl}$ is the number of scatters, $N_{ray}$ is the number of sub-paths included in each scatter, and $\alpha_{i,l}$ represents a channel coefficient of a corresponding scatter path, $a_{UE}$ and $a_{BS}$ represent antenna response vectors of the UE and the base station, respectively, and $\theta$ and $\phi$ are the horizontal and vertical angles of arrival, respectively.

For a uniform linear array (ULA), the antenna response vector is independent of the vertical angle of arrival $\phi$, and can be expressed as $$a_{ULA}(\phi) = \frac{1}{\sqrt{N}} \left[ 1, e^{j\frac{2\pi}{d}\lambda\sin(\theta)}, \ldots, e^{j\frac{2\pi}{d}\lambda(N-1)\sin(\theta)} \right]^T$$

Where $\lambda$ indicates wavelength, d indicates antenna pitch, and N indicates the number of antennas.

In a multi-user scenario, the millimeter-wave wireless communication system can also employ an analog-to-digital hybrid precoding architecture. FIG. 5a and FIG. 5b show configurations of the base station and the user equipment in the analog-to-digital hybrid precoding architecture, respectively.

As shown in FIG. 5a, the base station in the analog-to-digital hybrid precoding architecture has a baseband digital precoder and an analog phase shifting network. Under control of a controller, the baseband digital precoder obtains K-way data stream as an input, and the baseband digital precoder performs digital precoding on the K-way data stream, thereby eliminating interference between different data streams. Then, K radio frequency chains process, such as up-convert, amplify, filter, etc., the data stream pre-coded by the digital precoder to generate radio frequency signals. Generally, each of the K radio frequency chains corresponds to one UE.

K radio frequency chains are connected to the analog phase shifting network. Values of individual phase shifters included in the phase shifting network constitute an analog beamforming matrix F. In the matrix F, the kth column represents values of a group of phase shifters connected to the kth radio frequency chain, expressed as a weight vector $f_k$, and the weight vector $f_k$ must be selected from a codebook f for the base station.

For the phase shifting network, there are a variety of implementation manners. FIG. 6a and FIG. 6b show schematic diagrams of a full-connection phase shifting network and a sub-connection phase shifting network, respectively.

As shown in FIG. 6a, in a full-connection phase-shifting network, each RF chain is connected to a set of M phase shifters, so that there are K sets of phase shifters, the total number of phase shifters is K×M. Signals (K signals) output from respective phase shifters in each set of phase shifters are added by an adder and supplied to a corresponding antenna unit. In a full-connection phase-shifting network, each RF chain can be connected to all antennas via analog phase shifters.

As shown in FIG. 6b, in the sub-connection phase-shifting network, the output of each radio frequency chain is connected to P phase shifters (P is an integer and P≥1), and each phase shifter is connected to one antenna unit. That is to say, in the case of having K radio frequency chains, the number of antenna units M=K×P. In a sub-connection phase-shifting network, each radio frequency chain is connected to a part of the antennas via analog phase shifters. Usually, the antennas are evenly distributed to K radio frequency chains.

FIG. 5b shows the configuration of the user equipment in a hybrid precoding architecture. As shown in FIG. 5b, the user equipment is equipped with N antennas, and the signal received by each antenna is input to a radio frequency chain after passing through a corresponding phase shifter. The value of each phase shifter constitutes a weight vector $w_k$ for the user equipment, which can be selected from a codebook W for the user equipment. The radio frequency chain filters, amplifies, and downconverts the input signals to obtain digital received signals.

In this example, the user equipment has a plurality of radio frequency chains. According to the actual situation, it is also possible to adopt a design in which one radio frequency chain is employed for the user equipment.

In the hybrid precoding architecture, the beam training is a process of determining weight vectors of the base station and the user equipment from predetermined codebooks. Taking downlink transmission as an example, the maximum signal-to-noise ratio criterion can be expressed as:

$$\{w_{k,opt}, f_{k,opt}\} = \arg\max \|w^T H_k f\| \text{ where } w \in W, f \in F$$

Where $\{w_{k,opt}, f_{k,opt}\}$ indicates an optimal downlink weight vector for the k-th user equipment, and $H_k$ is a downlink channel matrix between the base station and the k-th user.

The traditional beamforming training mechanism mainly includes physical channel estimation, exhaustive search, multiple feedback and single feedback.

1. Physical channel estimation. The physical channel estimation mechanism directly estimates the downlink physical channel $H \in \mathbb{C}^{N \times M}$ by using a pilot, and the user equipment calculates optimal base station weight vector and optimal user equipment weight vector according to the estimated physical channel, and feeds back the base station weight vector or its index to the base station. However, in the millimeter wave system, both the base station and the user equipment are equipped with a large number of antennas, the complexity of channel estimation is extremely high, and the pilot is not beamformed in the channel estimation process, resulting in a low signal-to-noise ratio for reception and a low accuracy of channel estimation.

2. Exhaustive search. The exhaustive search mechanism searches for all possible combinations of the weight vector of the base station and the weight vector of the user equipment. The UE measures channel quality under each pair of transmit weight vector and receive weight vector, selects an optimal pair, and feeds back the optimal weight vector of the base station or its index to the base station. The exhaustive search mechanism can achieve optimal performance, but the complexity is extremely high. The number of weight vector combinations that need to be searched is P×Q, where P and Q are sizes of the base station codebook and user equipment codebook, respectively.

3. Multiple feedback. The multiple feedback mechanism divides the training process into multiple layers through pre-designed multi-layer codebooks, and the exhaustive search is employed in each layer. Since the number of candidate codewords in each layer is small, the complexity is reduced. The number of weight vector combinations that need to be detected by the multiple feedback mechanism is $\Sigma_{l=1}^{L} P_l Q_l$, where $P_l$ and $Q_l$ are sizes of l-th layer codebooks for the base station and the user equipment respectively, and L is the number of layers.

4. Single feedback. In order to further reduce the complexity of the beam training algorithm, only a part of all combinations of the weight vectors of the UE and the weight vectors of the base station may be selected for detection. For example, it may be combinations of one weight vector included in the base station codebook and all weight vectors included in the user equipment codebook, or may be combinations of one weight vector included in the user equipment codebook and all weight vectors included in the base station codebook. For example, in an embodiment, the weight vector in the user equipment codebook to be combined with all weight vectors included in the base station codebook can be selected according to the channel quality obtained from combinations of one weight vector included in the base station codebook and all weight vectors included in the user equipment codebook. A specific example is the single feedback mechanism. The single feedback mechanism splits the beamforming training into two processes. First, the base station transmits signals (for example, pilot signals) according to each weight vector in the base station codebook, and the UE uses an omnidirectional beam to receive the signals and estimates the channel quality corresponding to each weight vector in the base station codebook, and the UE selects a weight vector with the optimal channel quality and feeds back its index to the base station. Then, the base station fixedly uses the weight vector selected by the UE to transmit signals, and the UE selects a weight vector with the highest channel quality from the codebook, as the weight vector for communication with the base station (i.e., calculates channel qualities obtained from combinations of each weight vector in the user equipment codebook and the fixed weight vector of the base station, and selects a combination corresponding to the highest channel quality). Compared to the exhaustive search mechanism, the complexity of the single feedback mechanism is greatly reduced. The number of weight vector combinations that need to be searched in the single feedback mechanism is P+Q, where P and Q are sizes of the base station codebook and the user equipment codebook respectively.

Hereabove the beam training method is described by taking the downlink transmission in a single user scenario as an example. The process performed in the uplink transmission process is substantially similar. The main difference is that the UE transmits a signal and the base station receives the signal. In addition, the channel quality can be obtained by the channel estimation. Through the channel estimation, the channel direction and the channel quality can be obtained. In the channel estimation result, information indicating the channel quality, for example, CQI (Channel Quality Indicator) used in the LTE standard and identification information for the corresponding group of parameters (index of an optimal weight vector), may be included, and optimal multiple CQIs and identification information for a group of parameters corresponding to each CQI may be also included.

In a multi-user scenario, the beam training method may employ the exhaustive search, multiple feedback search, or single feedback search mechanism as described above, or other multi-user beam search mechanism.

In the FD-MIMO system, antennas of the base station and the UE are in a large scale, and much more candidate beams can be formed, and correspondingly, base station codebook and the user equipment codebook are also large in size. The beamforming training required by the existing exhaustive search, multiple feedback search or single feedback search mechanism is difficult to meet the practical application requirement.

In view of this, the applicant has proposed an improved beamforming training scheme.

In particular, the applicant has noted that in a wireless communication environment with huge-scale antennas, multiple antennas can typically be arranged in a two-dimensional planar antenna array, in which case an antenna response vector can typically be decomposed into a combination of several sub-vectors. Correspondingly, a weight vector for beamforming can also be decomposed into sub-weight vectors corresponding to the sub-vectors, so that respective sub-vectors of the weight vector can be determined by separately performing respective training in the beamforming training, and finally the desired weight vector can be determined by combination of the determined sub-vectors.

For example, in the case where the antennas are arranged in a two-dimensional antenna array, for a W×H Uniform Planar Array (UPA), where W is the number of horizontal antennas, H is the number of vertical antennas, the antenna response vector can be expressed as:

$$a_{UPA}(\phi,\theta) = a_h(\phi,\theta) \otimes a_v(\theta)$$

Where, $$a_h(\phi, \theta) = \frac{1}{\sqrt{W}}\left[1, e^{j\frac{2\pi}{d}\lambda \sin(\theta)\sin(\phi)}, \ldots, e^{j\frac{2\pi}{d}\lambda(W-1)\sin(\theta)\sin(\phi)}\right]^T$$

is the horizontal antenna response vector, $$a_v(\theta) = \frac{1}{\sqrt{H}}\left[1, e^{j\frac{2\pi}{d}\lambda \cos(\theta)}, \ldots, e^{j\frac{2\pi}{d}\lambda(H-1)\cos(\theta)}\right]^T$$

is the vertical antenna response vector, and $\otimes$ is Kronecker Product (KP).

In view of this, when the base station is equipped with a two-dimensional uniform planar array, due to Kronecker Product structure of the antenna response vector, a simulation codebook F can be generated by Kronecker Product of a horizontal codebook $F_h$ and a vertical codebook $F_v$, that is, $F=F_h \otimes F_v$. Based on this, the present disclosure performs the beamforming training in the horizontal domain and vertical domain by using the horizontal codebook and the vertical codebook which constitute the huge simulation codebook, respectively, obtains an optimal horizontal direction weight vector and an optimal vertical direction weight vector, and then calculates the trained optimal weight vector by means of Kronecker Product.

It should be understood that the Kronecker Product described above is illustrated as a preferred example which is easy to implement, and other suitable operations for decomposition and combination of codebooks are also possible, and similar effects can be achieved. Moreover, a key point of the present invention is to split the training into two directions, while the shape of an antenna and codebook are not forcibly constrained. In a possible case where multiple antennas are arranged in other two-dimensional or three-dimensional manners (for example, a curved antenna array or a cylinder antenna array), the training can still be split into two directions to obtain an optimal angle information in the first direction and an optimal angle information in the second direction, and the final optimal beam can be calculated by using a specific signal processing algorithm. In an example of the codebook, other suitable operations for decomposition and combination of the codebook are also conceivable and can achieve similar effects.

For example, in an example where antennas are arranged in a triangular planar antenna array, the beam training algorithm proposed by the present invention is still applicable. In such an example of a triangular antenna array or irregularly shaped antenna array, even if the antenna response vector does not have a Kronecker Product structure, since the antennas are arranged in a two-dimensional or more-dimensional antenna array, appropriate configuration values for phase shifters can be reasonably designed (may be based on codebooks or not), to make the triangular planar antenna array to obtain beams in the vertical direction and beams in the horizontal direction, respectively, perform beam training in the vertical direction and the horizontal direction respectively to obtain the direction of a specific user equipment, and then perform specific combination of the training results in the vertical direction and that in the horizontal directions (a combination of non-Kronecker Product form) to obtain a weight vector for the antenna array for configuring the actual transmission. For example, in the first step, the base station transmits a plurality of beams that are horizontally omnidirectional and vertically directional, so that beam information in the vertical direction, or the vertical angle-of-arrival information of channels, can be obtained by sweeping. Then, in the second step, the base station transmits a plurality of beams which are aligned with the direction determined in the first step in the vertical domain and are horizontally directional, so that beam information in the horizontal direction, or the horizontal angle-of-arrival information of channels, can be obtained by sweeping. Finally, the base station uses the beam information in the horizontal direction and that in the vertical direction to synthesize final service beams through a signal processing algorithm. Furthermore, although the foregoing mentions a case where an appropriate codebook is selected from training codebooks as an optimal direction weight vector for configuring the actual transmission, note that the basic idea of the present invention is still applicable to a case where the finally determined weight vector is excluded from the training codebooks.

For example, in the case where a specified actual codebook corresponding to a weight vector to be determined does not have the Kronecker Product characteristic, a codebook having the Kronecker Product characteristic can be used for training, the codebook being composed of a vertical part and a horizontal part. After training, the trained optimal weight vector is compared with code words in the actual codebook to find the closest one for actual transmission.

For example, if there does not exist a codebook specified for the weight vector to be determined, a codebook having a Kronecker Product characteristic can be applied to be dedicated to the training so as to obtain optimal weight vectors, and the optimal weight vectors obtained from the training may be adjusted by, for example, interpolating with suboptimal weight vectors or other vectors, to serve as weight vectors to be actually used.

Note that the complexity of the training method of the present application can be further reduced compared with the existing beamforming training mechanisms. For example, compared with the single feedback mechanism, the number of weight vector combinations that need to be detected by the single feedback mechanism is P+Q, where P and Q are sizes of codebooks for the base station and the user equipment, respectively, meanwhile in the case that the codebook for the base station can be decomposed, P=W*H, the complexity of the training method of the present application can be as low as W+H+Q.

According to an embodiment, the present application provides a beamforming training method and a device for implementing the same, wherein the beamforming training is performed by decomposing configuration parameters (e.g., weight vectors) to be determined into a plurality of sub-configuration parameters, determining the sub-configuration parameters respectively and combining the determined sub-configuration parameters to reconstruct optimal configuration parameters. Such a training process can at least achieve a performance similar with that of existing processes of beamforming training, while overhead of the training is significantly reduced.

Embodiments of the present invention will be described below with reference to the accompanying drawings.

According to an embodiment, there provides an electronic device for a first communication device of a wireless communication system, wherein the first communication device is equipped with a plurality of antennas. The electronic device comprises a processing circuit configured to configure a first transmission from the first communication device to a second communication device based on a plurality of sets of first sub-configuration parameters respectively, so that a specific set of first sub-configuration parameters are determined based on information related to the first transmission, wherein the plurality of sets of first sub-configuration parameters are associated with a first direction with respect to a plane in which the plurality of antennas are located; configure a second transmission from the first communication device to the second communication device based on a plurality of sets of second sub-configuration parameters respectively, so that a specific set of second sub-configuration parameters are determined based on information related to the second transmission, wherein the plurality of sets of second sub-configuration parameters are associated with a second direction with respect to the plane, the second direction being orthogonal to the first direction; and configure a subsequent transmission from the first communication device to the second communication device based on a specific set of first configuration parameters which are determined based on combination of the specific set of first sub-configuration parameters and the specific set of second sub-configuration parameters.

According an embodiment, the first communication device can be a base station, or a user equipment, and as correspondence, the second communication device can be a user equipment communicating with the base station, or alternatively, can be a base station communicating with the user equipment.

According an embodiment, a set of first configuration parameters for the first communication device can be phase values configuring each phase shifter in a set of phase shifters corresponding to the plurality of antennas one by one (that is, the above described weight vectors), and the set of first configuration parameters can be decomposed into a set of first sub-configuration parameters and a set of second sub-configuration parameters, and can be reconstructed by combination, which can be an inverse operation of the decomposition, such as Kronecker Product, of the set of first sub-configuration parameters and the set of second sub-configuration parameters. Based on the above, a specific set of first sub-configuration parameters and a specific set of second sub-configuration parameters can be determined from candidate codebooks respectively, and thus a specific set of first configuration parameters can be determined accordingly.

Each set of the plurality of sets of first sub-configuration parameters as candidate codebooks can be phase values used for configuring multiple phase shifters in a set of phase shifters corresponding to the plurality of antennas one by one, and each set of the plurality of sets of second sub-configuration parameters can be phase values, used for configuring multiple of phase shifters in the set of phase shifters. Where, the above multiple phase shifters corresponding to the plurality sets of first sub-configuration parameters and the above multiple phase shifters corresponding to the plurality sets of second sub-configuration parameters can be different from each other.

According to an embodiment, the plurality of sets of first sub-configuration parameters may be associated with a first direction of the plurality of antennas, and may be referred to as a plurality of first direction weight vectors, and may be also referred to as first direction codebooks. Each set of first sub-configuration parameters in the first-direction codebooks can be configured to align the directivity of the generated signal in the first direction by configuring phase values of a set of phase shifters corresponding to the plurality of antennas of the base station one by one. The plurality of sets of second sub-configuration parameters may be associated with a second direction of the plurality of antennas, i.e., a plurality of second direction weight vectors, and may be referred to as second direction codebooks. The first direction and the second direction may be with respect to a plane in which plurality of antennas of the base station are located. Each set of second sub-configuration parameters in the second-direction sub-codebooks can be configured to align the directivity of the generated signal in the second direction by configuring phase values of a set of phase shifters corresponding to the plurality of antennas of the base station on bey one. Typically, the first direction may be a horizontal direction relative to a plane of a plurality of antennas of the base station, and the second direction may be a vertical direction perpendicular to the plane of the plurality of antennas. In another case, the first direction may be the vertical direction and the second direction may be the horizontal direction. The first direction and the second direction may also be other directions as long as they are orthogonal to each other.

According to an embodiment, configuring the first transmission based on the plurality of sets of first sub-configuration parameters respectively may comprise configuring the first transmission based on the plurality of sets of first sub-configuration parameters and a predetermined set of second sub-configuration parameters. The predetermined set of second sub-configuration parameters may be pre-determined by the wireless communication system.

According to an embodiment, configuring the second transmission based on the plurality of sets of second sub-configuration parameters respectively may comprise configuring the second transmission based on a specific set of first sub-configuration parameters and the plurality of sets of second sub-configuration parameters.

According to an embodiment, the information related to the first transmission can be information indicating communication channel quality of the first transmission. As an example, such information may be obtained by channel estimation for the transmission at the second communication device. For example, such information may include a communication channel quality estimate for the first transmission corresponding to each set of first sub-configuration parameters, whereby based on the estimation result, a set of first sub-configuration parameters corresponding to the optimal communication channel quality may be determined as a specific set of first sub-configuration parameters. According to an embodiment, the information related to the first transmission may further indicate a set of first sub-configuration parameters by which the communication channel quality of the first transmission is optimal or an index of the set of first sub-configuration parameters. In the latter case, a set of first sub-configuration parameters corresponding to the index can be found from a plurality of sets of first sub-configuration parameters stored or obtained in advance.

Such information may be obtained by a second communication device in communication with the first communication device or by other devices other than the first communication device and the second communication device, and the specific set of first sub-configuration parameters may be determined and provided to the first communication device by the second communication device or other devices, or may be determined by the processing circuit of the first communication device based on such information being fed, or may be determined and provided to the processing circuit by other circuits of the first communication device based on such information being feeded.

The information related to the second transmission can be information indicating communication channel quality of the second transmission. This information may be similar with the information related to the first transmission, and a specific set of second sub-configuration parameters may be obtained in a manner similar with that for the specific set of first sub-configuration parameters. Therefore, detailed description for the information related to the second transmission is omitted here.

According to an embodiment, the specific set of first configuration parameters may be determined by combination, such as Kronecker Product, of a specific set of first sub-configuration parameters and a specific set of second sub-configuration parameters. As an example, the specific set of first configuration parameters may be determined by the processing circuit of the first communication device, or determined and provided to the processing circuit by an apparatus of the first communication device other than the processing circuit, or may be determined and provided to the processing circuit by a device external to the first communication device, such as, a second communication device or another communication device.

According to an embodiment, there provides a method for a wireless communication system, wherein the wireless communication system comprises a first communication device and a second communication device, and the first communication device is equipped with a plurality of antennas. The method comprises configuring a first transmission from the first communication device to a second communication device based on a plurality of sets of first sub-configuration parameters respectively, so that a specific set of first sub-configuration parameters are determined based on information related to the first transmission, wherein the plurality of sets of first sub-configuration parameters are associated with a first direction with respect to a plane in which the plurality of antennas are located; configuring a second transmission from the first communication device to the second communication device based on a plurality of sets of second sub-configuration parameters respectively, so that a specific set of second sub-configuration parameters are determined based on information related to the second transmission, wherein the plurality of sets of second sub-configuration parameters are associated with a second direction with respect to the plane, the second direction being orthogonal to the first direction; and configuring a subsequent transmission from the first communication device to the second communication device based on a specific set of first configuration parameters which are determined based on combination of the specific set of first sub-configuration parameters and the specific set of second sub-configuration parameters.

Such a method may be implemented by the first communication device in the wireless communication system or by another device in the wireless communication system other than the first and second communication devices.

To further facilitate understanding, an implementation of the technique of the present invention in a case where the first communication device is a base station and the second communication device is a user equipment will be described below with reference to FIG. 7a. FIG. 7a shows the base station having a processing circuit 701, and optionally, a weight vector synthesis unit 702 and a memory 703, as indicated by the dashed boxes in the figure. Note that such description is just as an example, instead of limitation.

According to an embodiment, a plurality of sets of the first sub-configuration parameters (first direction sub-codebooks) and a plurality of sets of the second sub-configuration parameters (second-direction sub-codebooks) may be pre-stored in the memory 703 of the first communication device, or derived from a plurality of sets of first configuration parameters pre-stored in the memory 703 of the first communication device. It should be noted that the memory 703 is not necessary for the first communication device 700, and in some cases, the first direction sub-codebooks and the second direction sub-codebooks can be determined by the first communication device from some parameters, e.g., the size of the antenna array, or alternatively, may be provided from the outside the first communication device.

In operation, the processing circuit 701 can be configured to configure signal transmission from the base station, such that the beamforming training between the base station and the user equipment is performed based on the first direction sub-codebooks and the second direction sub-codebooks for the base station.

For example, in the first direction beamforming training (first transmission), the base station transmits a signal (e.g., a pilot signal or a reference signal, a training signal) based on the first direction sub-codebooks to communicate with the user equipment, and the user equipment performs channel estimation according to the signal transmitted by the base station, such that a first direction weight vector (i.e., a specific set of first sub-configuration parameters for phase shifters) that is optimal for the communication (e.g., optimal communication channel quality) can be determined based on the estimation. In the second direction beamforming training (second transmission), the base station transmits a signal (e.g., a pilot signal or a reference signal, a training signal) based on the second direction sub-codebooks to communicate with the user equipment, and the user equipment performs channel estimation according to the signal transmitted by the base station, such that a second direction weight vector (i.e., a specific set of second sub-configuration parameters) that is optimal for the communication (e.g., optimal communication channel quality) can be determined based on the estimation.

The sub-configuration parameters may be determined by the user equipment and provided to the base station as communication-related information, or may be determined by another device other than the base station and the user equipment based on the estimation result and provided to the base station. Alternatively, the estimation result may be provided by the user equipment to the base station to determine the sub-configuration parameters at the base station.

After knowing the determined optimal first direction weight vector (i.e., the specific set of first sub-configuration parameters) and the determined optimal second direction weight vector (i.e., the specific set of second sub-configuration parameters), an optimal weight vector for the base station (i.e., a specific set of first configuration parameters) can be obtained by specific combination of the determined optimal first direction weight vector and the determined optimal second direction weight vector, the optimal weight vector can be used for configuring a phase value of each phase shifter in a set of phase shifters. The specific combination may for example be Kronecker Product.

The determination of the optimal weight vector may be performed at the first communication device (e.g., the base station), such as by the processing circuit 701, or by the weight vector synthesis unit 702 outside of the processing circuit, of course, the weight vector synthesis unit 702 is optional. Alternatively, the optimal weight vector may be determined by the user equipment or determined by another device other than the user equipment and provided to the first communication device.

According to an embodiment, there provides an electronic device for a second communication device of a wireless communication system, the electronic device comprising a processing circuit configured to acquire information related to a first transmission configured by a first communication device based on a plurality of sets of first sub-configuration parameters separately, wherein the plurality of sets of first sub-configuration parameters are associated with a first direction with respect to a plane in which the plurality of antennas are located, and acquire information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction; wherein a specific set of first sub-configuration parameters determined based on the information related to the first transmission and a specific set of second sub-configuration parameters determined based on the information related to the second transmission are used for determining a specific set of first configuration parameters configuring a subsequent transmission from the first communication device to the second communication device.

According to an embodiment, the acquired transmission-related information may be obtained by the second communication device by channel estimation for the transmission, or by another device other than the first communication device and the second communication device by channel estimation for the transmission and provided to the second communication device.

According to an embodiment, the acquisition of information by the electronic device can be performed in a variety of manners. According to an embodiment, acquiring the information related to the first transmission configured by the first communication device based on a plurality of sets of first sub-configuration parameters separately can comprise acquiring information on communication channel quality of the first transmission configured by the first communication device based on a plurality of sets of first sub-configuration parameters and a predetermined set of second sub-configuration parameters; wherein the specific set of first sub-configuration parameters are a set of first sub-configuration parameters causing the communication channel quality of the first transmission to be optimal.

According to an embodiment, acquiring the information related to the second transmission configured by the first communication device based on a plurality of sets of second sub-configuration parameters separately can comprise acquiring information on communication channel quality of the second transmission configured by the first communication device based on the specific set of first sub-configuration parameters and a plurality of sets of second sub-configuration parameters; wherein the specific set of second sub-configuration parameters are a set of second sub-configuration parameters causing the communication channel quality of the second transmission to be optimal.

By way of example, the above-described information on communication channel quality may be obtained by the second communication device itself, for example, directly obtained by the processing circuit of the second communication device or obtained by another component in the second communication device and provided to the processing circuit, or may be another device external to the second communication device and provided to the second communication device.

Figure 7B:
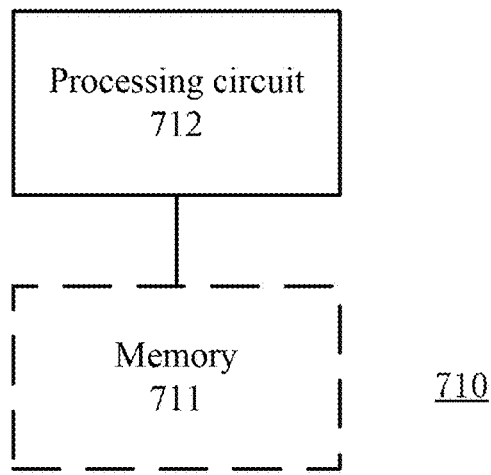
FIG. 7b shows a schematic diagram of an electronic device for another communication device in a wireless communication system, in accordance with one embodiment of the present invention.

An exemplary description will be described below with reference to FIG. 7*b*, which shows a schematic diagram of an electronic device for the other communication device in a wireless communication system in accordance with one embodiment of the present invention. The other communication device is for communicating with the communication device of FIG. 7*a*. For example, when the electronic device 700 of FIG. 7*a* is located to a base station, the other electronic device 710 of FIG. 7*b* is in a user equipment. When the electronic device 700 of FIG. 7*a* is located in a user equipment, the other electronic device 710 of FIG. 7*b* is in a base station. The following is an example in which the electronic device of FIG. 7*b* is located in the user equipment.

As shown in FIG. 7*b*, the electronic device 710 can include a memory 711 and a processing circuit 712.

The memory 711 can be used to store simulation codebooks and/or the first direction sub-codebook and the second direction sub-codebook for the base station, as the memory 703 of FIG. 7a. The simulation codebooks and/or the first direction sub-codebook and the second direction sub-codebook for the base station may be transmitted by the base station to the electronic device 710. To reduce signaling overhead, the base station may also only transmit some device parameters of the base station (for example, the size of the antenna array), and the electronic device 710 may determine the simulation codebooks and/or the first direction sub-codebook and the second direction sub-codebook for the base station based on the device parameters. Like memory 703, this memory 711 is also not necessary for the electronic device 710.

In operation, the processing circuit 712 may perform channel estimation on the signal transmission (the first transmission) from the base station based on the first direction sub-codebook, and provide feedback of the channel estimation result to the base station, so that the base station determines an optimal first direction weight vector (i.e., a specific set of first sub-configuration parameters). In some cases, the feedback of the channel estimation result may be a first direction weight vector in the first direction sub-codebook that optimizes the communication channel quality or an index of the first direction weight vector. In other cases, the feedback of the channel estimation result may be only the channel estimation result itself, and the base station can determine the first direction weight vector corresponding to the optimal communication channel quality according to the received channel estimation result.

Of course, the feedback of the channel estimation result may also be provided to another device other than the base station and the user equipment for determining the first direction weight vector, and the determined first direction weight vector is then provided to the first communication device.

The processing circuit 712 can also perform channel estimation on the signal transmission (the second transmission) from the base station based on a second direction sub-codebook, and feedback the result of the channel estimation to the base station, so that the base station can determine an optimal second direction weight vector (that is, a specific set of second sub-configuration parameters). In some cases, the feedback of the channel estimation result may be a second direction weight vector in the second direction sub-codebook that makes the communication channel quality to be optimal, or an index of the second direction weight vector. In other cases, the feedback of the channel estimation result may only be the channel estimation result itself, and the base station determines a second direction weight vector corresponding to the optimal communication channel quality according to the received channel estimation result.

Of course, the feedback of the channel estimation result may also be provided to another device other than the base station and the user equipment for determining the second direction weight vector, and the determined second direction weight vector is then provided to the first communication device.

In addition, an optimal weight vector obtained by combining the determined first direction weight vector and the determined second direction weight vector may also be determined by the user equipment and provided to the base station, may be determined by the base station itself, or may be determined by another device other than the user equipment and the base station and provided to the base station.

According to an embodiment, there provides a method for a wireless communication system, wherein the wireless communication system comprises a first communication device and a second communication device, and the first communication device is equipped with a plurality of antennas, the method comprising: acquiring information related to a first transmission configured by a first communication device based on a plurality of sets of first sub-configuration parameters separately, wherein the plurality of sets of first sub-configuration parameters are associated with a first direction with respect to a plane in which the plurality of antennas are located, and acquiring information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction; wherein a specific set of first sub-configuration parameters determined based on the information related to the first transmission and a specific set of second sub-configuration parameters determined based on the information related to the second transmission are used for determining a specific set of first configuration parameters configuring a subsequent transmission from the first communication device to the second communication device.

An exemplary implementation of beamforming training in accordance with an embodiment will now be described with reference to FIG. 8, which illustrates a flowchart of beamforming training using the electronic devices of FIG. 7a and FIG. 7b in accordance with an embodiment of the present invention.

Figure 8:
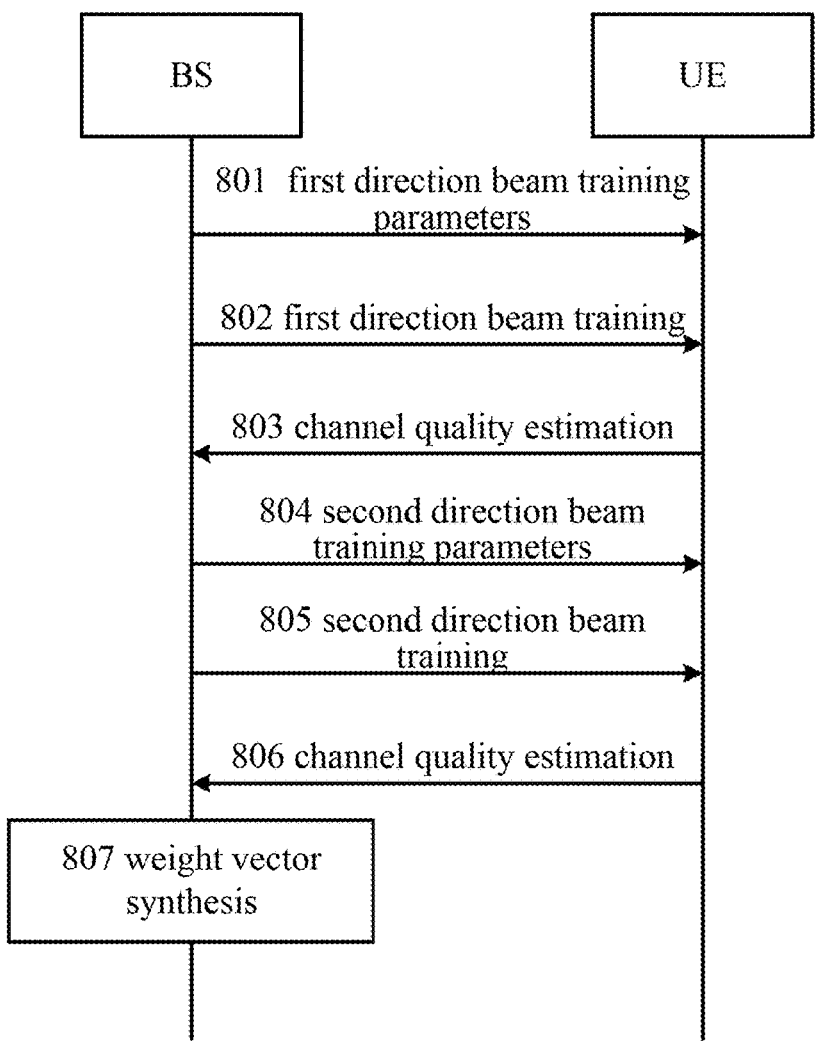
FIG. 8 shows a flow chart of beamforming training using the electronic device of FIG. 7 in a base station, in accordance with one embodiment of the present invention.

As shown in FIG. 8, in step 801, the base station indicates to the user equipment first direction beamforming training parameters, for example, information indicating a training sequence for the user equipment, start time and end time of the first direction beamforming training (for example, the subframe number), the number of times of transmitting the training sequence, and the like.

At step 802, the base station transmits the training sequence to the user equipment based on a first direction sub-codebook for first direction beamforming training. Specifically, the base station repeatedly transmits the training sequence based on each first direction weight vector (each set of first sub-configuration parameters) in the first direction sub-codebook.

At step 803, the user equipment uses the processing circuit 712 to perform channel estimation based on the training sequence and transmit feedback of the channel estimation result to the base station. The feedback of the channel estimation result is, for example, a first direction weight vector (a specific set of first sub-configuration parameters) in the first direction sub-codebook that makes the communication channel quality to be optimal, or an index of the first direction weight vector, or simply the channel estimation result itself.

In step 804, the base station indicates to the user equipment second direction beamforming training parameters, for example, start time and end time of a second direction beamforming training (for example, the subframe number), the number of times of transmitting a training sequence, and the like.

At step 805, the base station transmits a training sequence to the user equipment based on a second direction sub-codebook for a second direction beamforming training. Specifically, the base station repeatedly transmits the training sequence based on each second direction weight vector (each set of second sub-configuration parameters) in the second direction sub-codebook.

At step 806, the user equipment uses the processing circuit 712 to perform channel estimation based on the training sequence and transmit feedback of the channel estimation results to the base station. The feedback of the channel estimation result is, for example, a second direction weight vector (a specific set of second sub-configuration parameters) in the second direction sub-codebook that makes the communication channel quality to be optimal, or an index of the second direction weight vector, or simply the channel estimation result itself.

At step 807, the base station obtains an optimal weight vector (a specific set of first configuration parameters) based on the optimal first direction weight vector (a specific set of first sub-configuration parameters) and the optimal second direction weight vector (a specific set of second sub-configuration parameters) by a specific combination thereof.

It should be understood that in implementation, the above described process of the base station performing the first direction beamforming training or transmitting the training sequence to the user equipment based on the first direction sub-codebook includes: the base station synthesizes a plurality of sets of first configuration parameters by Kronecker Product of each first direction weight vector in the first direction sub-codebook and a certain second direction weight vector, such as phase values for setting a set of phase shifters corresponding to the plurality of antennas of the base station, for transmission, wherein the second direction weight vector may be a weight vector corresponding to a second direction omnidirectional beam, or may be a known second direction weight vector. Similarly, in implementation, the above described process of the base station performing the second direction beamforming training or transmitting the training sequence to the user equipment based on the second direction sub-codebook includes: the base station synthesizes a plurality of sets of first configuration parameters by Kronecker Product of each second direction weight vector in the second direction sub-codebook and a certain first direction weight vector, and then performs the beamforming training. In order to make the description concise, the Kronecker Product synthesis step in the beamforming training of the base station or the user equipment in one direction will not be specifically set forth when the beaming forming is described below.

Note that steps 801 and 804 described above may be combined into a single step, for example, the base station may indicate to the user equipment first directional beamforming training parameters and second directional beamforming training parameters in step 801.

In implementation, the implementation of the two steps 801 and 804 can be combined into one piece of signaling, which is sent to the user equipment in the first step of training. Of course, the two steps 801 and 804 are separate instructions when the training is performed independently in two directions.

In addition, preferably, this configuration signaling is a dedicated signaling, which is, for example, implemented as radio resource control signaling for personalizing the configuration of individual user equipments.

The above description for FIG. 8 is merely an example and is not intended to serve as limitation. Note that some implementations in the process described with reference to FIG. 8, such as determination of a specific set of first sub-configuration parameters, a specific set of second sub-configuration parameters, and a specific set of first configuration parameters may be implemented in alternative manners, as described above.

FIG. 8 primarily illustrates a flow chart of utilizing the beamforming training mechanism of the present invention when the first communication device (e.g., base station) has multiple antennas, particularly a two-dimensional uniform planar array (UPAs). In a practical situation, the second communication device (e.g., user equipment) in communication with the first communication device may also have multiple antennas. At this time, upon receipt of a training sequence (e.g., a pilot signal) for beamforming training transmitted from the first communication device, a specific set of configuration parameters for the second communication device (i.e., an optimal receive weight vector for the second communication device) also needs to be determined, for example, can be selected from respective receive weight vectors in simulation codebooks for the second communication device, such that signals transmitted from the first communication device can obtain the best channel quality. This process is also referred to as receive beam sweeping or receive weight vector sweeping hereinafter. After receive beam sweeping, the user equipment can perform subsequent communications by fixedly using the optimal receive weight vector.

Thus, in accordance with an embodiment, the second communication device is configured to receive the signal transmission from the First communication device by means of a plurality of sets of second configuration parameters, and such reception may correspond to receive beam sweeping or receive weight vector sweeping. A specific set of second configuration parameters for configuring the second communication device is determined based on information related to the signal transmission.

According to an embodiment, the information related to the signal transmission is information indicating a communication channel quality of the signal transmission, and wherein the specific set of second configuration parameters is a set of second configuration parameters that optimizes the communication channel quality of the signal transmission. Note that the meaning of the information related to the signal transmission is similar with the meaning of the information related to the first transmission and the meaning of the information related to the second transmission described above, and thus detailed description thereof is omitted herein.

According to an embodiment, a specific set of second configuration parameters may be determined at the second communication device, or determined by another device other than the second communication device and fed back to the second communication device.

According to an embodiment, the signal transmission may precede the first transmission and the second transmission, for example, may precede the first direction beamforming training in step 802 of FIG. 8, and in this case, the first communication device may configure the signal transmission based on a predetermined set of first configuration parameters.

According to an embodiment, the signal transmission may be after the first transmission and the second transmission, for example after the second direction beamforming training in step 805 of FIG. 8, and in this case, the first communication device may configure the signal transmission based on the determined specific set of first sub-configuration parameters and the determined specific set of second sub-configuration parameters.

According to an embodiment, the signal transmission may be between the first transmission and the second transmission, for example, between the first direction beamforming training in step 802 of FIG. 8 and the second direction beamforming training in step 805 of FIG. 8, and in this case, the first communication device can configure the signal transmission based on the specific set of first sub-configuration parameters and a predetermined set of second sub-configuration parameters.

According to an embodiment, the signal transmission may be the first transmission, for example, may be performed simultaneously with the first direction beamforming training in step 802 of FIG. 8, and in this case, the specific set of second configuration parameters may be determined by, in a case that the first communication device configures the first transmission with each of the plurality of sets of first sub-configuration parameters and the second communication device receives the first transmission by using each of the plurality of sets of second configuration parameters sequentially, a set of second configuration parameters that optimize channel communication quality of the corresponding first transmission is selected as the specific set of second configuration parameters.

According to an embodiment, the signal transmission may be the second transmission, for example, may be performed simultaneously with the second direction beamforming training in step 805 of FIG. 8, and in this case, the specific set of second configuration parameters may be determined by, in a case that the first communication device configures the second transmission with each of the plurality of sets of second sub-configuration parameters and the second communication device receives the second transmission by using each of the plurality of sets of second configuration parameters sequentially, a set of second configuration parameters that optimize channel communication quality of the corresponding second transmission is selected as the specific set of second configuration parameters.

Note that in a case where a second communication device (e.g., user equipment) has multiple antennas, the multiple antennas of the second communication device may also be a two-dimensional uniform planar array. In this case, similar to the case of the first communication device, a second configuration parameter for the second communication device can also be decomposed into several sub-configuration parameters, and each sub-configuration parameter can be determined separately and the determined sub-configuration parameters can be combined to reconstruct an optimal second configuration parameter.

According to an embodiment, the specific set of second configuration parameters for the second communication device are derived from a specific set of third sub-configuration parameters and a specific set of fourth sub-configuration parameters, the third sub-configuration parameters and the four sub-configuration parameters are respectively associated with a third direction and a fourth direction of a plane corresponding to the plurality of antennas of the second communication device, and the third direction and the fourth direction are perpendicular to each other, wherein the specific set of third sub-configuration parameters are determined by the second communication device receiving a signal transmission from the first communication device based on a plurality of sets of third sub-configuration parameters and determining a set of third sub-configuration parameters that optimize communication channel quality of the signal transmission, and wherein the specific set of fourth sub-configuration parameters are determined by the second communication device receiving a signal transmission from the first communication device based on a plurality of sets of fourth sub-configuration parameters and determining a set of fourth sub-configuration parameters that optimize communication channel quality of the signal transmission.

The above beamforming process of the second configuration parameters for the second communication device will be described below with reference to FIGS. 9-14, respectively. Such a description is made on a premise that the first communication device is a base station and the second communication device is a user equipment, and it should be noted that such description is merely exemplary without limiting.

Note that, in order to make the description concise, the aforementioned configuration steps of the base station dedicated for beamforming training with respect to the user equipment, namely steps 801 and 804, are omitted in the following description with reference to FIGS. 9-14.

Before starting the description with reference to FIGS. 9-14, the omni-direction beams, horizontal omnidirectional beams, and vertical omnidirectional beams to be used will be described. Where the omnidirectional beam has substantially the same gain at all horizontal and vertical angles of arrival, which can be expressed, for example, as:

$$|a_{UPA}(\phi, \theta)^T f_{omni}| = C, \forall \phi \in \left[-\frac{\pi}{2}, \frac{\pi}{2}\right], \forall \theta \in [-\pi, \pi]$$

Where C is a constant, a typical omnidirectional beam example is $f_{omni}=[1, 0, \ldots, 0]^T \in C^{N \times 1}$, where N is the number of antennas.

The horizontal omnidirectional beam has substantially the same gain at all horizontal angles of arrival and can be expressed, for example, as:

$$|a_{UPA}(\phi,\theta)^T(f_{h,omni} \otimes f_v)|=C(\phi), \forall \theta \in [-\pi,\pi]$$

Where $C(\phi)$ is a function of the vertical angle of arrival $\phi$, $f_v$ is an arbitrary vertical beam, and a typical horizontal omnidirectional beam example is $f_{h,omni}=[1, 0, \ldots, 0]^T \in C^{W \times 1}$, where W is the number of antennas in the horizontal direction.

The vertical omnidirectional beam has substantially the same gain at all vertical arrival angles. It can be expressed, for example, as:

$$|a_{UPA}(\phi, \theta)^T (f_h \otimes f_{v,omni})| = C(\theta), \forall \phi \in \left[-\frac{\pi}{2}, \frac{\pi}{2}\right]$$

Where $C(\theta)$ is a function of the horizontal angle of arrival $\theta$, $f_h$ is an arbitrary horizontal beam, and a typical vertical omnidirectional beam example is $f_{v,omni}=[1, 0, \ldots, 0]^T \in C^{H \times 1}$.

Note that the predetermined set of first configuration parameters as described in the above can correspond to omnidirectional beam, and the predetermined set of second sub-configuration parameters as described in the above can correspond to horizontal or vertical omnidirectional beam.

Figure 9A:
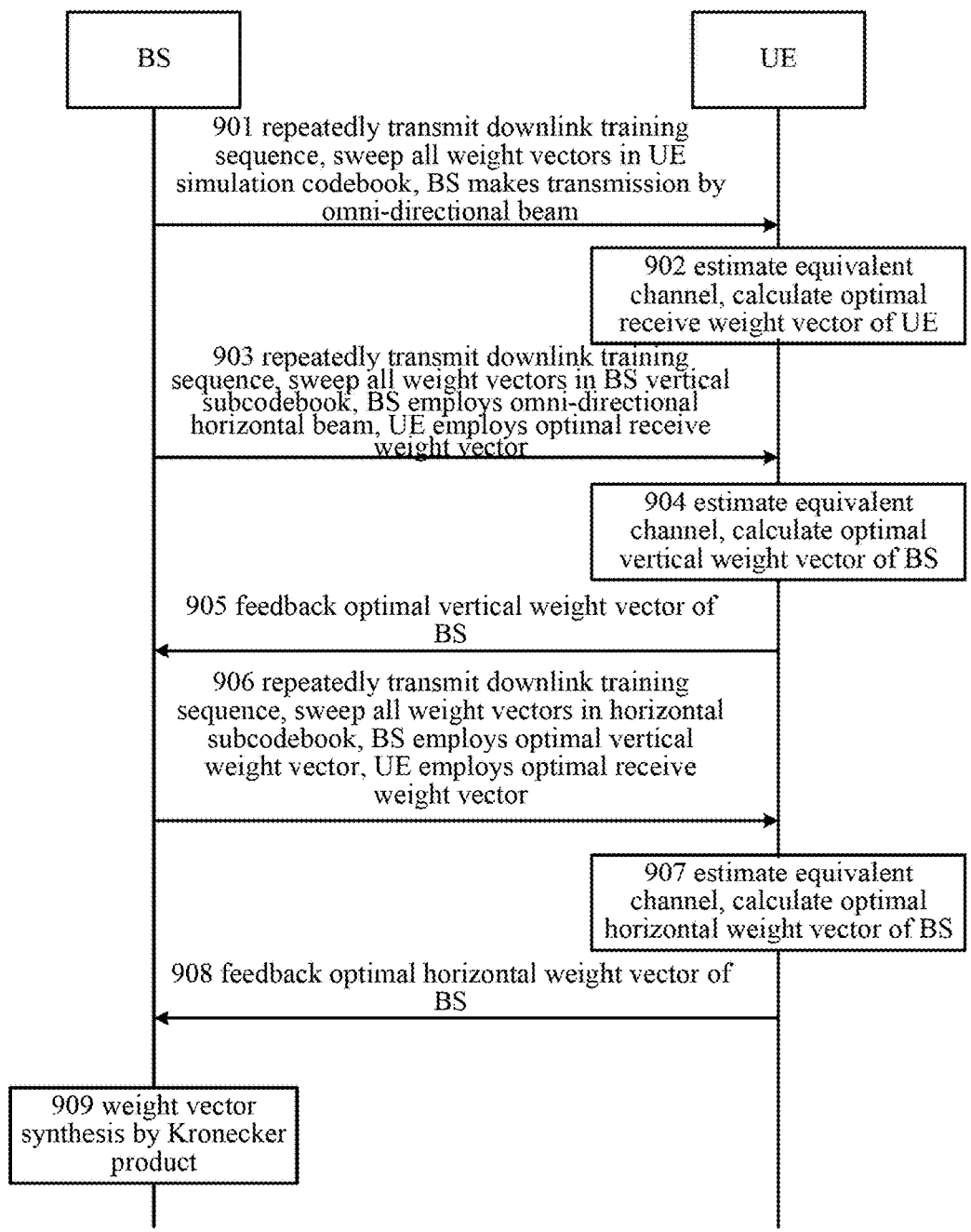
FIG. 9a shows a flow chart of beamforming training in accordance with one embodiment of the present invention.

FIG. 9a shows a flow chart of beamforming training in accordance with one embodiment of the present invention, wherein the receive beam sweeping of the user equipment precedes the first direction beamforming training of the base station (i.e., the first transmission described above).

As shown in FIG. 9a, in step 901, the base station repeatedly transmits a downlink training sequence using an omnidirectional beam (i.e., a predetermined set of first configuration parameters corresponding to a predetermined set of first sub-configuration parameters and a predetermined set of second sub-configuration parameters) to sweep all weight vectors in a simulation codebook for the user equipment. Here, the number of times of transmitting the training sequence may depend on the size of the simulation codebook for the user equipment. For example, if the simulation codebook of the user equipment includes Q weight vectors (i.e., the size of the simulation codebook of the user equipment is Q), the number of times the beamforming training sequence needs to be transmitted is greater than or equal to Q.

At step 902, the user equipment estimates an equivalent channel according to the received training sequence and calculates an optimal receive weight vector of the user equipment. The optimal receive weight vector may be a weight vector in the simulation codebook of the user equipment that makes the channel quality to be best. This can be expressed as follows:

$$\{w_{opt}\}=\arg \max |w^T H f_{omni}| s.t. w \in W$$

Where $f_{omni}$ is an omnidirectional beam and $w_{opt}$ is an optimal receive weight vector.

After step 902, the user equipment will utilize the optimal receive weight vector as the receive weight vector to be used in subsequent transmissions (i.e., a specific set of second configuration parameters).

In step 903, the base station employs a horizontal omnidirectional beam (i.e., a predetermined set of second sub-configuration parameters) to sweep all weight vectors in the vertical direction sub-codebook of the base station (i.e., multiple sets of first sub-configuration parameters) to repeatedly transmit a downlink training sequence, and the user equipment performs receipt by means of the receive weight vector determined in step 902. Here, the number of times transmitting the training sequence may depend on the size of the vertical direction sub-codebook of the base station. For example, if the vertical direction sub-codebook of the base station includes H weight vectors (i.e., the size of the vertical direction sub-codebook of the base station is H), the number of times the beamforming training sequence needs to be transmitted is equal to H.

At step 904, the user equipment estimates an equivalent channel according to the received training sequence and calculates an optimal vertical direction weight vector for the base station. The optimal vertical direction weight vector may be a vertical direction weight vector in the vertical direction simulation codebook of the base station that makes the channel quality to be best. It can be expressed as:

$$\{f_{v,opt}\}=\arg \max |w_{opt}^T H(f_{h,omni} \otimes f_v)| s.t. f_v \in F_v$$

Where $f_{h,omni}$ is a horizontal omnidirectional beam, $w_{opt}$ is a received beam trained in step 902, and $f_{v,opt}$ is an optimal vertical beam.

At step 905, the user equipment transmits the optimal vertical direction weight vector determined in step 904 as feedback of the channel estimation result to the base station. The feedback of the channel estimation result may be the optimal vertical direction weight vector itself, or may be an index of the optimal vertical direction weight vector. In some cases, the feedback of the channel estimation result may also be only the channel estimation results corresponding to each weight vector in the vertical direction sub-codebook of the base station itself, and the base station per se determines an optimal vertical direction weight vector after receipt of such feedback.

In step 906, the base station sweeps all weight vectors in the horizontal sub-codebook (i.e., a plurality of second sub-configuration parameters) by using the optimal vertical direction weight vector determined in step 904, to repeatedly transmit the downlink training sequence, and the user equipment still performs reception by using the optimal receive weight vector determined in step 902. Here, the number of times of transmitting the training sequence may depend on the size of the horizontal direction sub-codebook of the base station. For example, if the horizontal direction sub-codebook of the user equipment includes W weight vectors (i.e., the size of the horizontal direction sub-codebook of the user equipment is W), the number of times the beamforming training sequence needs to be transmitted is equal to W.

At step 907, the user equipment estimates an equivalent channel according to the received training sequence and calculates an optimal horizontal direction weight vector for the base station. The optimal horizontal direction weight vector may be a horizontal direction weight vector in the horizontal direction simulation sub-codebook of the base station that makes the channel quality to be best. It can be expressed as:

$$\{f_{h,opt}\}=\arg \max |w_{opt}^T H(f_h \otimes f_{v,opt})| s.t. f_h \in F_h$$

Where $w_{opt}$ is the receive beam obtained by training in step 902, $f_{v,opt}$ is the vertical direction weight vector obtained by training in step 904, and $f_{h,opt}$ is the optimal horizontal direction weight vector.

At step 908, the user transmits the optimal horizontal direction weight vector determined in step 907 as feedback of the channel estimation result to the base station. Similarly, the feedback of the channel estimation result may be the optimal horizontal direction weight vector itself or its index, or may be the channel estimation result itself.

At step 909, the base station synthesizes an optimal weight vector (i.e., a specific set of first configuration parameters) based on the optimal vertical direction receive vector determined in step 904 and the optimal horizontal direction receive weight vector determined in step 907 by Kronecker Product thereof. That is, $f_{opt}=f_{h,opt} \otimes f_{v,opt}$.

So far, the downlink beamforming training between the base station and the user equipment is completed, and the required times of training sequence transmission is Q+H+W. Compared with the traditional beamforming training mechanism, if the exhaustive search mechanism is adopted, the number of times of transmitting the training sequence is P×Q, where P=H×W, which is the size of simulation codebook of the base station; if a single feedback search mechanism is used, the number of times of transmitting the training sequence transmission is P+Q. It can be seen that compared with the traditional beamforming training mechanism, the beamforming training mechanism of the present invention can greatly reduce the training overhead.

Note that in the above flow, the base station first performs vertical direction beam sweeping and then horizontal direction beam sweeping, but it should be recognized that the base station may also first perform horizontal direction beam sweeping and then vertical direction beam sweeping. The process now is basically the same as that of FIG. 9a, except that in step 903, the base station uses a vertical omnidirectional beam to sweep all weight vectors in the horizontal direction sub-codebook, which is not described detailedly herein.

Figure 9B:
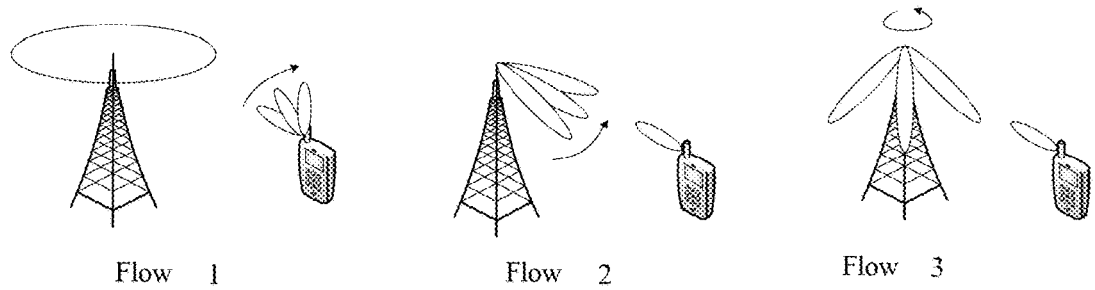
FIG. 9b shows a schematic diagram of beamforming training in accordance with one embodiment of the present invention.

FIG. 9b shows a schematic diagram of steps 901 (flow 1), 903 (flow 2) and 906 (flow 3) of FIG. 9a. That is, the process 1 indicates that the base station performs transmission by using an omnidirectional beam, and the user equipment performs receive beam sweeping; the process 2 indicates that the base station uses the horizontal omnidirectional beam for vertical beam sweeping, and the user equipment employs a fixed optimal receive beam; the process 3 indicates that the base station uses an optimal vertical beam for horizontal beam sweeping, and the user equipment uses the fixed optimal receive beam.

Note that in the embodiment illustrated in FIGS. 9a, b, the base station employs omnidirectional beam transmission without providing a beamforming gain, which will affect the receive beam training of the user equipment to some extent. As an improved example, for example, according to rough orientation (e.g., obtained by existing positioning scheme, such as direction angle of arrival estimation, LBS, etc., or GPS information) of the user equipment, the base station may transmit a wide beam in a corresponding direction to provide a certain beamforming gain so as to assist the user equipment in the receive beam sweeping. For example, a wide beam may mean that the gain of the beam is concentrated in a wide range of all possible values of the horizontal and vertical angles of arrival.

Further, it should be noted that when the base station transmits an omnidirectional beam for training, a beamforming gain is not provided, which may sometimes affect beam training at the user equipment. Therefore, as an improved embodiment, it may be considered that the beam of the base station is trained firstly and then the beam of the user equipment is trained. This will be described in further detail below.

Figure 10A:
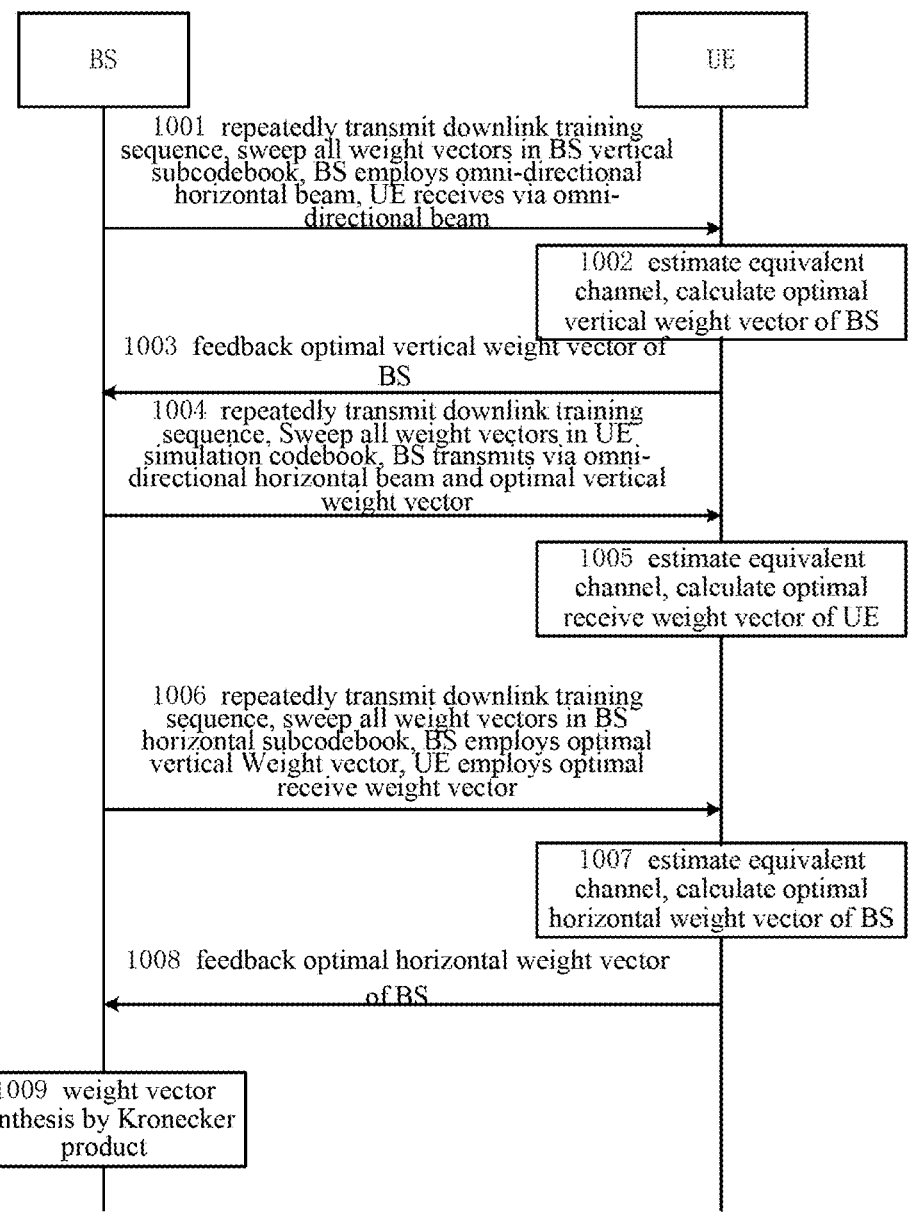
FIG. 10a shows a flow chart of beamforming training in accordance with one embodiment of the present invention.

FIG. 10a illustrates a flow chart of beamforming training in accordance with one embodiment of the present invention, in which the receive beam sweeping of the user equipment is between a first direction beamforming training (i.e., the first transmission described above) and a second direction beamforming training (i.e., the second transmission described above) of the base station.

As shown in FIG. 10a, in step 1001, the base station repeatedly transmits a downlink training sequence using a horizontal omnidirectional beam to sweep all weight vectors in the vertical direction sub-codebook of the base station, and the user equipment performs reception by using an omnidirectional beam. Here, the number of times of transmitting the training sequence may depend on the size of the vertical direction sub-codebook of the base station. For example, if the vertical direction sub-codebook of the base station includes H weight vectors (i.e., the size of the vertical direction sub-codebook of the base station is H), the number of times the beamforming training sequence needs to be transmitted is H.

At step 1002, the user equipment estimates an equivalent channel according to the received training sequence and calculates an optimal vertical direction weight vector of the base station. The optimal vertical direction weight vector may be a vertical direction weight vector in the vertical direction sub-codebook of the base station that makes the channel quality to be best. It can be expressed as:

$$\{f_{v,opt}\}=\arg\max|w_{omni}^{T}H(f_{h,omni}\otimes f_{v})|\ s.t.\ f_{v}\in F_{v}$$

Where $f_{h,omni}$ is a horizontal omnidirectional beam, $w_{omni}$ is an omnidirectional receive beam, and $f_{v,opt}$ is an optimal vertical direction weight vector.

At step 1003, the user equipment transmits the optimal vertical direction weight vector determined in step 1002 as feedback of the channel estimation result to the base station. The feedback of the channel estimation result may be the optimal vertical direction weight vector itself or its index. In some cases, the feedback of the channel estimation result may also be only the channel estimation results corresponding to each weight vector in the vertical direction sub-codebook of the base station itself, and the base station per se determines an optimal vertical direction weight vector after receipt of such feedback.

In step 1004, the base station repeatedly transmits a downlink training sequence using a horizontal omnidirectional beam and the optimal vertical direction weight vector determined in the step 1002 to sweep all weight vectors in the simulation codebook of the user equipment. Here, the number of times of transmitting the training sequence may depend on the size of the simulation codebook of the user equipment. For example, if the simulation codebook of the user equipment includes Q weight vectors (i.e., the size of the simulation codebook of the user equipment is Q), the number of times the beamforming training sequence needs to be transmitted is Q.

As step 1005, the user equipment estimates an equivalent channel according to the received training sequence and calculates an optimal receive weight vector for the user equipment. The optimal receive weight vector may be a weight vector in the simulation codebook of the user equipment that makes the channel quality to be best. This can be expressed as follows:

$$\{w_{opt}\}=\arg\max|w^{T}H(f_{h,omni}\otimes f_{v,opt})|\ s.t.\ w\in W$$

Where $f_{h,omni}$ is a horizontal omnidirectional beam, $f_{v,opt}$ is a vertical beam trained in step 1002, and $w_{opt}$ is an optimal receive beam.

After step 1005, the user equipment will utilize the optimal receive weight vector as the receive weight vector to be used in subsequent transmissions.

In step 1006, the base station sweeps all weight vectors in the horizontal sub-codebook by using the optimal vertical direction weight vector determined in step 1002 to repeatedly transmit the downlink training sequence, and the user equipment performs reception by using the optimal receive weight vector determined in step 1005. Here, the number of times of transmitting the training sequence may depend on the size of the horizontal direction sub-codebook of the base station. For example, if the horizontal direction sub-codebook of the user equipment includes W weight vectors (i.e., the size of the horizontal direction sub-codebook of the user equipment is W), the number of times the beamforming training sequence needs to be transmitted is equal to W.

At step 1007, the user equipment estimates an equivalent channel according to the received training sequence and calculates an optimal horizontal direction weight vector for the base station. The optimal horizontal direction weight vector may be a horizontal direction weight vector in the horizontal direction simulation sub-codebook of the base station that makes the channel quality to be best. It can be expressed as:

$$\{f_{h,opt}\}=\arg\max|w_{opt}^{T}H(f_{h}\otimes f_{v,opt})|\ s.t.\ f_{h}\in F_{h}$$

Where $w_{opt}$ is the receive beam trained in step 1005, $f_{v,opt}$ is the vertical direction weight vector trained in step 1002, and $f_{h,opt}$ is the optimal horizontal direction weight vector.

At step 1008, the user equipment transmits the optimal horizontal direction weight vector determined in step 1007 as feedback of the channel estimation result to the base station. Similarly, the feedback of the channel estimation result may be the optimal horizontal direction weight vector itself or its index, or may be the channel estimation result itself.

At step 1009, the base station synthesizes an optimal weight vector based on the optimal vertical direction receive vector determined in step 1002 and the optimal horizontal direction receive weight vector determined in step 1007 by Kronecker Product thereof, that is, $f_{opt}=f_{h,opt}\otimes f_{v,opt}$.

So far, the downlink beamforming training between the base station and the user equipment is completed, and the required times of training sequence transmission is H+Q+W. Compared with the traditional beamforming training mechanism, the beamforming training mechanism of the present invention can greatly reduce the training overhead.

Note that in the above flow, the base station first performs vertical direction beam sweeping and then horizontal direction beam sweeping, but it should be recognized that the base station may also first perform horizontal direction beam sweeping and then vertical direction beam sweeping, which is not described detailedly herein.

Figure 10B:
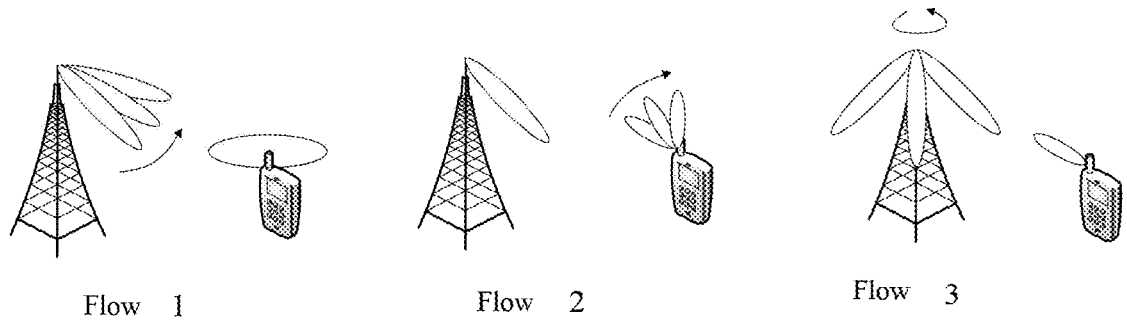
FIG. 10b shows a schematic diagram of beamforming training in accordance with one embodiment of the present invention.

FIG. 10b shows a schematic diagram of steps 1001 (flow 1), 1004 (flow 2) and 1006 (flow 3) in FIG. 10a. That is, the process 1 indicates that the base station uses the horizontal omnidirectional beam for vertical beam sweeping, and the user equipment performs reception by using an omnidirectional beam; the process 2 indicates that the base station uses the horizontal omnidirectional beam and the optimal vertical beam, and the user equipment sweeps the receive beam; the process 3 shows that the base station uses the optimal vertical beam for horizontal beam sweeping, and the user equipment uses a fixed optimal receive beam.

Figure 11:
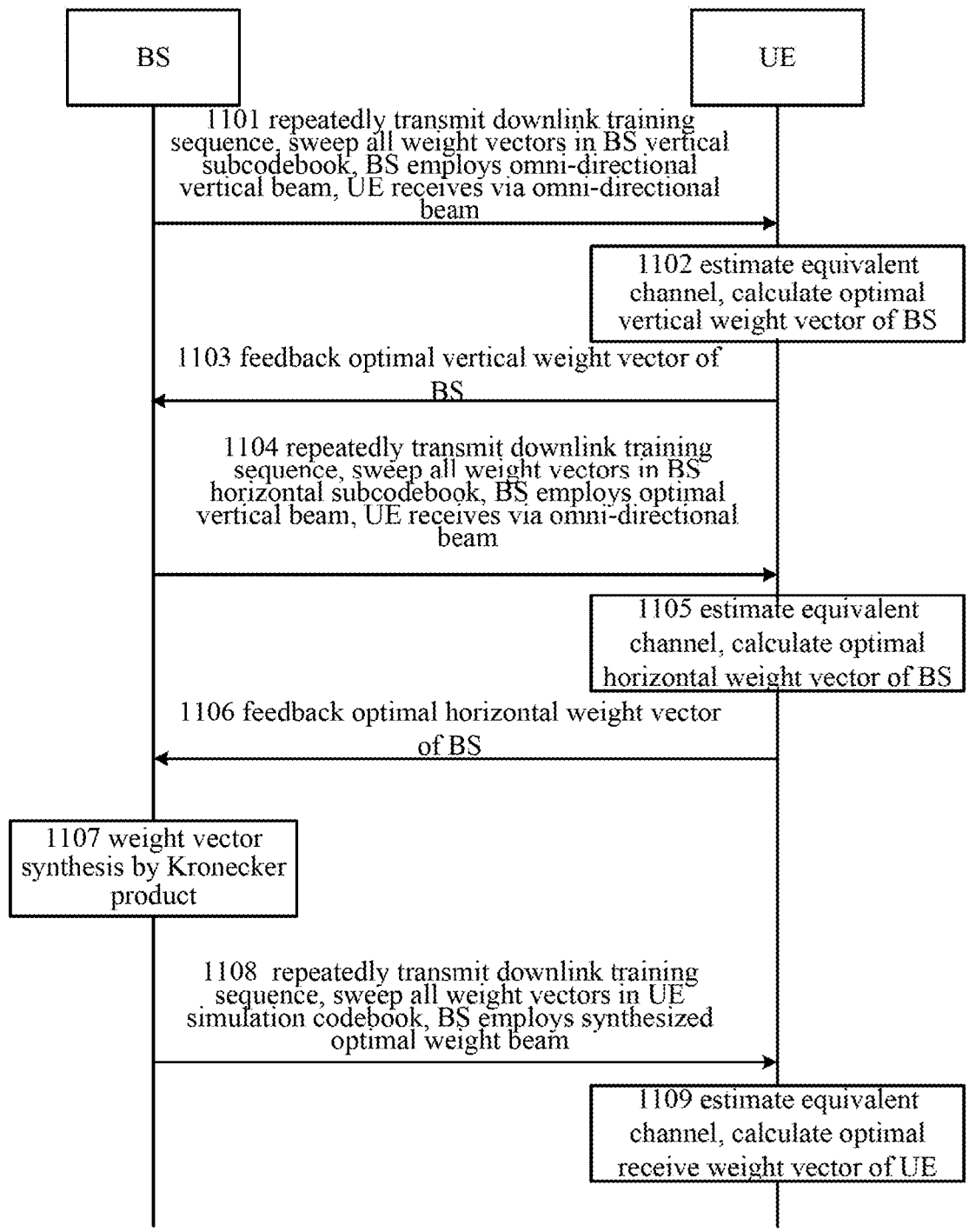
FIG. 11 shows a flow chart of beamforming training in accordance with one embodiment of the present application.

FIG. 11 shows a flow chart of beamforming training in accordance with an embodiment of the present invention, in which the receive beam sweeping of the user equipment follows the first direction beamforming training (i.e., the first transmission described above) and the second direction beamforming training (i.e., the second transmission described above) of the base station.

In step 1101, the base station repeatedly transmits a downlink training sequence using a horizontal omnidirectional beam to sweep all weight vectors in the vertical direction sub-codebook of the base station, and the user equipment performs reception by using an omnidirectional beam.

At step 1102, the user equipment estimates an equivalent channel based on the received training sequence and calculates an optimal vertical direction weight vector for the base station.

At step 1103, the user equipment transmits the optimal vertical direction weight vector determined in step 1102 as feedback of the channel estimation result to the base station.

In step 1104, the base station sweeps all weight vectors in a horizontal sub-codebook using the optimal vertical direction weight vector determined in step 1102, and repeatedly transmits the downlink training sequence, and the user still uses the omnidirectional beam for reception.

At step 1105, the user equipment estimates an equivalent channel based on the received training sequence and calculates an optimal horizontal direction weight vector for the base station.

At step 1106, the user equipment transmits the optimal horizontal direction weight vector determined in step 1105 as feedback of the channel estimation result to the base station.

At step 1107, the base station synthesizes an optimal weight vector based on the optimal vertical direction receive vector determined in step 1102 and the optimal horizontal direction receive weight vector determined in step 1105 by Kronecker Product thereof.

At step 1108, the base station repeatedly transmits the downlink training sequence using the optimal weight vector obtained in step 1107 to scan all weight vectors in the simulation codebook of the user equipment.

At step 1109, the user equipment estimates an equivalent channel based on the received training sequence and calculates an optimal receive weight vector for the user.

The training overhead required by the beamforming training mechanism of FIG. 11 is the same as that of the beam training mechanisms of FIGS. 9 and 10, all being much smaller than the training overhead of the conventional beamforming training mechanism.

The above description of FIGS. 9-11 is merely an example and is not intended to serve as limitation. It should be noted that some implementations in the processes described with reference to FIGS. 9-11, such as the determination of a specific set of first sub-configuration parameters, a specific set of second sub-configuration parameters, and a specific set of first configuration parameters, may be implemented in alternative manners, as described above.

All the above description belong to a case where the receive beam sweeping of the user equipment and the first direction beam sweeping and the second direction beam sweeping of the base station are performed separately.

The following will describe a process flow in which the receive beam sweeping of the user equipment is performed simultaneously with the first direction beam sweeping (i.e., the first transmission described above) or the second direction beam sweeping (i.e., the second transmission described above) of the base station with reference to FIG. 12 to FIG. 13.

Figure 12A:
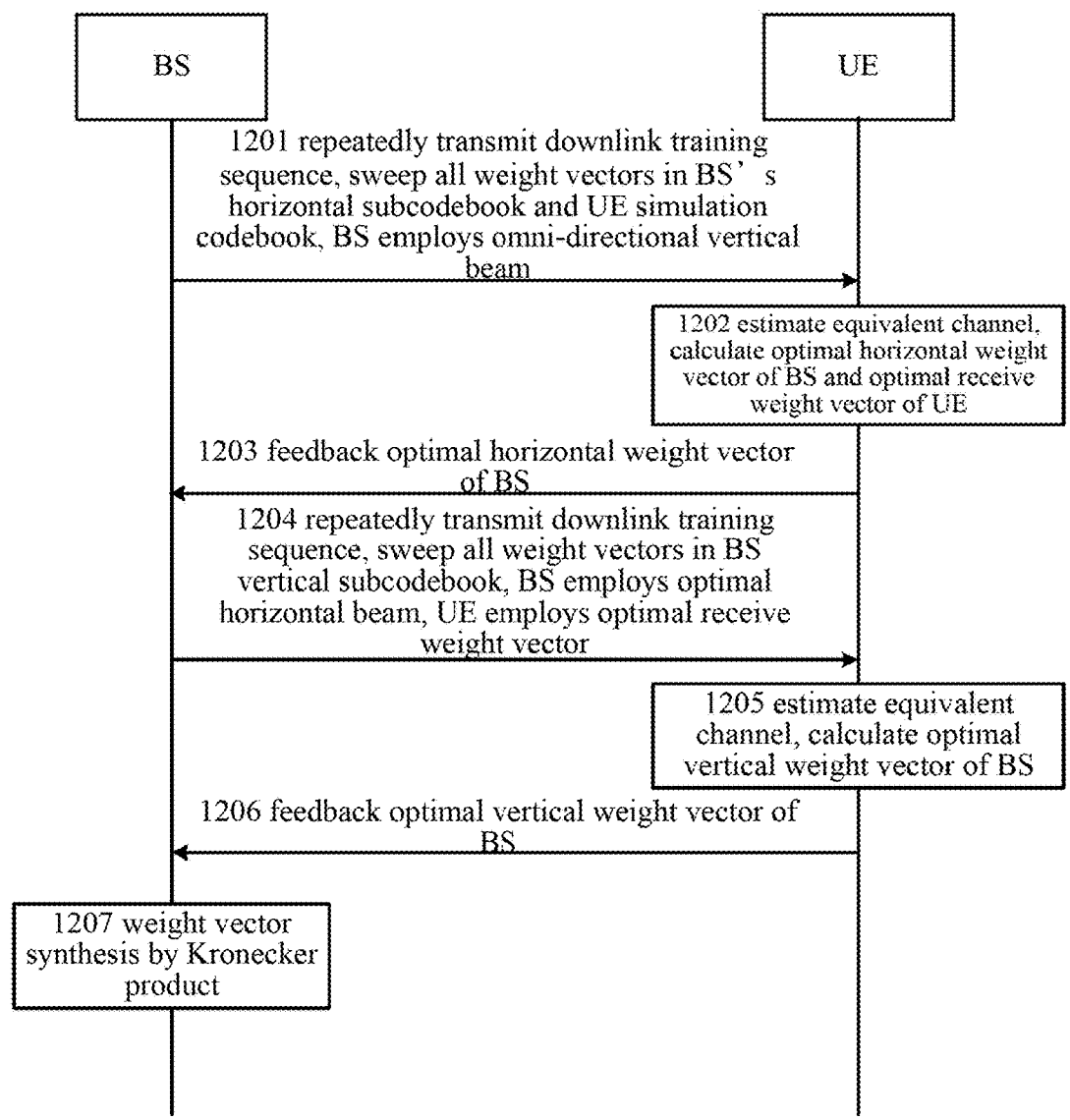
FIG. 12a shows a flow chart of beamforming training in accordance with another embodiment of the present invention.

FIG. 12a illustrates a flow diagram of beamforming training in accordance with one embodiment of the present invention in which the user's receive beam sweeping is performed simultaneously with the first direction beamforming training of the base station. The first direction is the horizontal direction and the second direction is the vertical direction.

In step 1201, the base station sweeps all weight vectors in the horizontal sub-codebook of the base station and all weight vectors in the simulation codebook of the user equipment by using a vertical omnidirectional beam, to repeatedly transmit the downlink training sequence. Here, the number of times of transmitting the training sequence may depend on the size of the horizontal direction sub-codebook of the base station and the size of the simulation codebook of the user equipment. For example, if the horizontal direction sub-codebook of the base station includes W weight vectors (i.e., the size of the horizontal direction sub-codebook of the base station is W), and the simulation codebook of the user equipment includes Q weight vectors (i.e., the size of the simulation codebook of the user equipment is Q), the number of times the beamforming training sequence needs to be transmitted is equal to W×Q.

At step 1202, the user equipment estimates an equivalent channel according to the received training sequence and calculates a combination of optimal weight vectors. That is to say, according to the training sequence, the user can calculate which one of all combinations of each weight vector in the horizontal direction sub-codebook of the base station and each weight vector in the simulation codebook of the user equipment can achieve the best channel quality. Through this calculation, the user equipment can obtain the optimal horizontal direction weight vector of the base station and the optimal receive weight vector of the user equipment. In subsequent transmissions, the base station and the user equipment will perform transmission using the selected pair of weight vectors it can be expressed as:

$$\{w_{opt}, f_{h,opt}\} = \arg\max |w^T H(f_h \otimes f_{v,omni})| \, s.t. \, w \in W, f_h \in F_h$$

Where $f_{v,omni}$ is a vertical omnidirectional beam, $w_{opt}$ is the optimal receive weight vector of the user equipment, and $f_{h,opt}$ is the optimal horizontal direction weight vector of the base station.

At step 1203, the user equipment transmits the optimal horizontal direction weight vector determined in step 1202 as feedback of the channel estimation result to the base station.

In step 1204, the base station sweeps all weight vectors in the vertical direction sub-codebook of the base station by using the optimal horizontal direction weight vector determined in step 1202 to repeatedly transmit the downlink training sequence, and the user performs reception by using the optimal weight vector determined in step 1202. Here, the number of times of transmitting the training sequence may depend on the size of the vertical direction sub-codebook of the base station. For example, if the vertical direction sub-codebook of the base station includes H weight vectors (i.e., the size of the vertical direction sub-codebook of the base station is H), the number of times the beamforming training sequence needs to be transmitted is H.

At step 1205, the user equipment estimates an equivalent channel according to the received training sequence and calculates an optimal vertical direction weight vector of the base station. That is to say, according to the training sequence, the user can calculate which one of the vertical direction weight vectors in the vertical direction sub-codebook of the base station can achieve the best channel quality. It can be expressed as:

$$\{f_{v,opt}\} = \arg\max |w_{opt}^T H(f_{h,opt} \otimes f_v)| \, s.t. f_v \in F_v$$

Where $w_{opt}$ is the receive weight vector trained in step 1202, $f_{h,opt}$ is the optimal horizontal direction weight vector of the base station trained in step 1202, and $f_{v,opt}$ is the optimal vertical direction weight vector of the base station.

At step 1206, the user equipment transmits the optimal vertical direction weight vector of the base station determined in step 1205 as feedback of the channel estimation result to the base station.

At step 1207, the base station synthesizes an optimal weight vector based on the optimal horizontal direction vector determined in step 1202 and the optimal vertical direction weight vector determined in step 1205 by Kronecker Product thereof, for usage in subsequent transmission to the user equipment.

So far, the downlink beamforming training between the base station and the user equipment has been completed, and the training overhead is W×Q+H. Since the antenna array of the base station is usually larger than the number of antennas of the user end, the size of the horizontal sub-codebook and the size of the vertical sub-codebook obtained by decoupling the simulation codebook of the base station is also larger than that of the simulation codebook of the user equipment accordingly. In this case, the beamforming overhead can be reduced by using the beamforming training mechanism shown in FIG. 12.

Figure 12B:
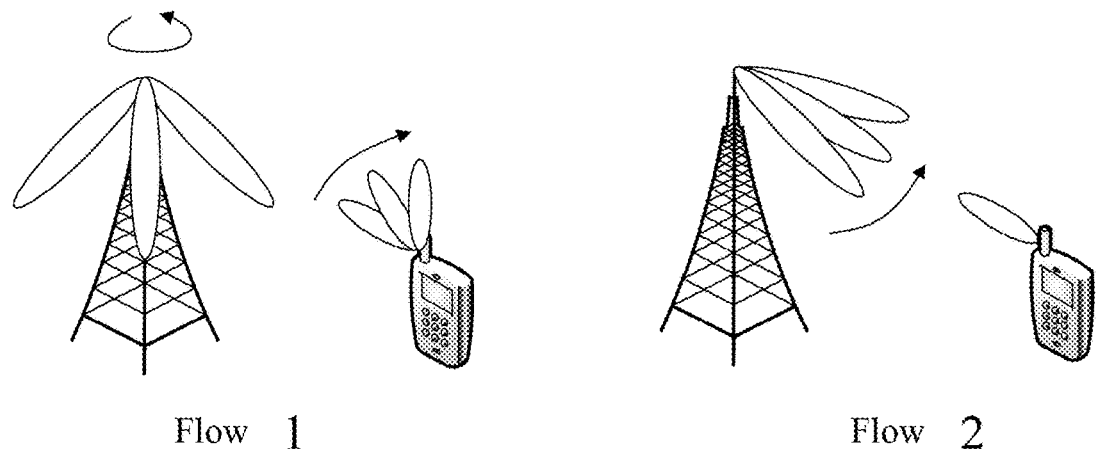
FIG. 12b shows a schematic diagram of beamforming training in accordance with another embodiment of the present invention.

FIG. 12b shows a schematic diagram of steps 1201 (flow 1) and 1204 (flow 2) in FIG. 12a. That is, the process 1 indicates that the base station uses the vertical omnidirectional beam for horizontal beam sweeping, and the user equipment performs the receive beam sweeping; the process 2 indicates that the base station uses the optimal horizontal beam for vertical beam sweeping, and the user equipment utilizes the optimal receive beam for reception. Although the flow 1 is shown prior to the flow 2 in FIGS. 12a and 12b, those skilled in the art will recognize that flow 2 can also be performed prior to the flow 1.

Figure 13A:
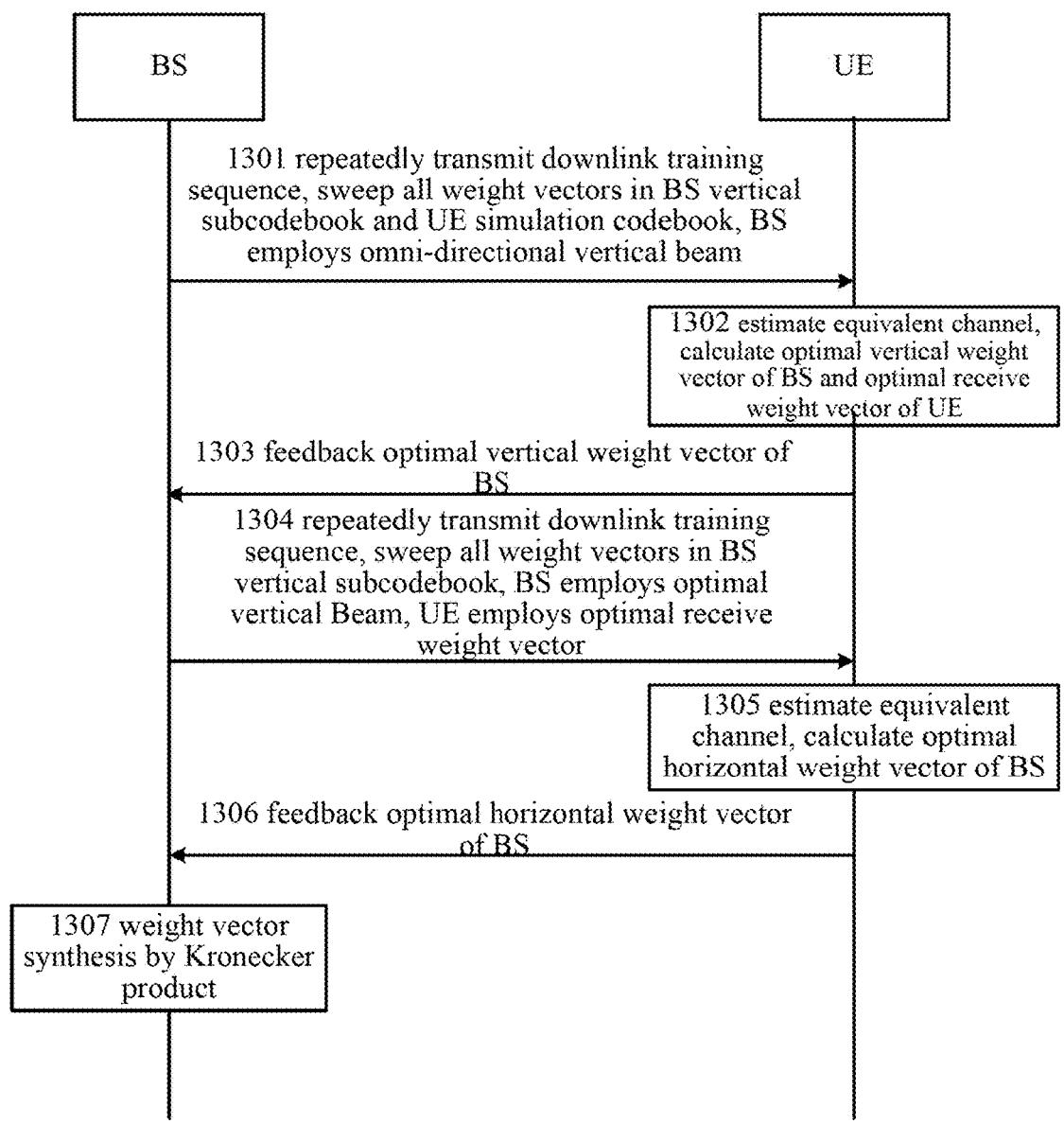
FIG. 13a shows a flow chart of beamforming training in accordance with another embodiment of the present invention.

FIG. 13a shows a flow diagram of beamforming training in accordance with one embodiment of the present invention in which the user's receive beam sweeping is performed simultaneously with the second direction beamforming training of the base station. The first direction is the horizontal direction and the second direction is the vertical direction.

In step 1301, the base station sweeps all weight vectors in the vertical sub-codebook of the base station and all weight vectors in the simulation codebook of the user equipment by using a horizontal omnidirectional beam, to repeatedly transmit the downlink training sequence. Here, the number of times of transmitting the training sequence may depend on the size of the vertical direction sub-codebook of the base station and the size of the simulation codebook of the user equipment. For example, if the vertical direction sub-codebook of the base station includes H weight vectors (i.e., the size of the vertical direction sub-codebook of the base station is H), and the simulation codebook of the user equipment includes Q weight vectors (i.e., the size of the simulation codebook of the user equipment is Q), the number of times the beamforming training sequence needs to be transmitted is equal to H×Q.

At step 1302, the user equipment estimates an equivalent channel according to the received training sequence and calculates a combination of optimal weight vectors. That is to say, according to the training sequence, the user can calculate which one of all combinations of each weight vector in the vertical direction sub-codebook of the base station and each weight vector in the simulation codebook of the user equipment can achieve the best channel quality. Through this calculation, the user can obtain the optimal vertical direction weight vector of the base station and the optimal receive weight vector of the user. In subsequent transmissions, the base station and the user equipment will perform transmission using the selected pair of weight vectors. It can be expressed as:

$$\{w_{opt}, f_{v,opt}\} = \arg\max |w^T H(f_{h,omni} \otimes f_v)| \, s.t. w \in W, f_v \in F_v$$

Where $f_{h,omni}$ is a horizontal omnidirectional beam, $w_{opt}$ is the user's optimal receive weight vector, and $f_{v,opt}$ is the optimal vertical direction weight vector of the base station.

At step 1303, the user transmits the optimal vertical direction weight vector determined in step 1302 as feedback of the channel estimation result to the base station.

In step 1304, the base station sweeps all weight vectors in the horizontal direction sub-codebook of the base station by using the optimal vertical direction weight vector determined in step 1302 to repeatedly transmit the downlink training sequence, and the user performs reception by using the optimal weight vector determined in step 1302. Here, the number of times of transmitting the training sequence may depend on the size of the horizontal direction sub-codebook of the base station. For example, if the horizontal direction sub-codebook of the base station includes W weight vectors (i.e., the size of the horizontal direction sub-codebook of the base station is W), the number of times the beamforming training sequence needs to be transmitted is W.

At step 1305, the user estimates an equivalent channel based on the received training sequence and calculates an optimal horizontal direction weight vector for the base station. That is to say, according to the training sequence, the user can calculate which one of the horizontal direction weight vectors in the horizontal direction sub-codebook of the base station can achieve the best channel quality. It can be expressed as:

$$\{f_{h,opt}\} = \arg\max |w_{opt}^T H(f_h \otimes f_{v,opt})| \, s.t. f_h \in F_h$$

Where $w_{opt}$ is the optimal receive weight vector of the user trained in step 1302, and $f_{v,opt}$ is the optimal vertical direction weight vector of the base station trained in step 1302, and $f_{h,opt}$ is the optimal horizontal direction weight vector of the base station.

At step 1306, the user transmits the optimal horizontal direction weight vector of the base station determined in step 1305 to the base station as feedback of the channel estimation result.

At step 1307, the base station synthesizes an optimal weight vector based on the optimal vertical direction vector determined in step 1302 and the optimal horizontal direction weight vector determined in step 1305 by Kronecker Product thereof, for usage in subsequent transmission to the user equipment.

So far, the downlink beamforming training between the base station and the user equipment has been completed, and the training overhead is H×Q+W. Since the antenna array of the base station is usually larger than the number of antennas of the user end, the size of the horizontal sub-codebook and the size of the vertical sub-codebook obtained by decoupling the simulation codebook of the base station is also larger than that of the simulation codebook of the user equipment accordingly. In this case, the beamforming overhead can be reduced by using the beamforming training mechanism shown in FIG. 13.

This embodiment uses an exhaustive search mechanism in steps 1202 and 1302 described above to determine the optimal horizontal direction weight vector for the base station and the optimal receive weight vector for the user. However, the implementation of the present application is not limited to this embodiment, and those skilled in the art may recognize that the beam training process of step 1302 may also be performed by using a multiple-feedback search mechanism or a single feedback search mechanism in the prior art.

It can be seen that the beamforming training process shown in FIG. 13 can be obtained by changing the horizontal direction in FIG. 12 to the vertical direction and the vertical direction to the horizontal direction, and other configuration parameters can be kept substantially the same.

Figure 13B:
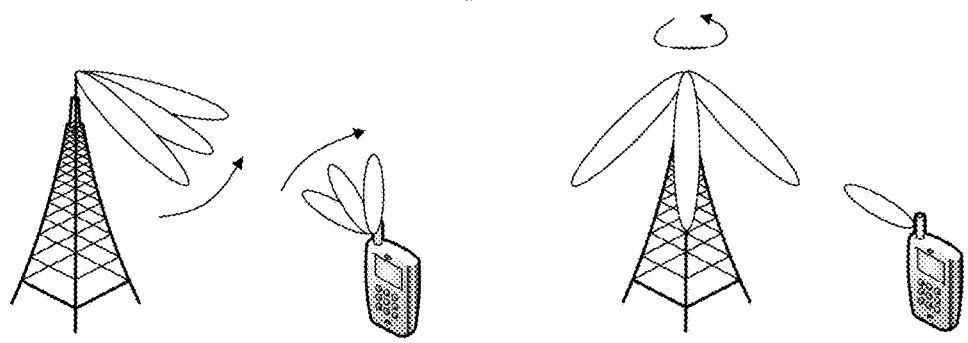
FIG. 13b shows a schematic diagram of beamforming training in accordance with another embodiment of the present invention.

FIG. 13*b* shows a schematic diagram of steps 1301 (flow 1) and 1304 (flow 2) in FIG. 13*a*. That is, the process 1 indicates that the base station uses the horizontal omnidirectional beam for vertical beam sweeping, and the user equipment performs the receive beam sweeping; the process 2 indicates that the base station uses the optimal vertical beam for horizontal beam sweeping, and the user equipment utilizes the optimal receive beam for reception. Although the flow 1 is shown prior to the flow 2 in FIGS. 13*a* and 13*b*, those skilled in the art will recognize that flow 2 can also be performed prior to the flow 1.

The above description with reference to FIGS. 12-13 is merely an example and is not intended to serve as limitation. It should be noted that some implementations in the processes described with reference to FIGS. 12-13, such as the determination of a specific set of first sub-configuration parameters, a specific set of second sub-configuration parameters, and a specific set of first configuration parameters, may be implemented in alternative manners, as described above.

The above description does not distinguish whether antennas of the user equipment is a two-dimensional uniform planar array, but simply considers the simulation codebook of the user equipment as a whole. In fact, when the user equipment has a two-dimensional uniform planar array, in order to further reduce the training overhead, the receive beam sweeping of the user equipment may be split into a third direction beam sweeping and a fourth direction beam sweeping perpendicular to the third direction, or the simulation codebook of the user equipment may be split into the third direction sub-codebook and the fourth direction sub-codebook for beamforming training. Similar to the splitting of the simulation codebook of the base station, the simulation codebook of the user equipment can also be expressed in the form of Kronecker product of the third direction sub-codebook and the fourth direction sub-codebook. The third direction and the fourth direction may be directions relative to a plane of the antenna array of the receiving device. Those skilled in the art can recognize that the third direction beam sweeping and the fourth direction beam sweeping can be combined with the first direction beam sweeping and the second direction beam sweeping of the base station shown in FIGS. 9-13 in a variety of manners, for example, may be performed separately from the first direction beam sweeping and the second direction beam sweeping, or may be performed simultaneously with any of the first direction beam sweeping and the second direction beam sweeping. Preferably, the beam sweeping of the first direction, the second direction, the third direction, and the fourth direction are performed separately to reduce the training overhead as much as possible. This will be described below with reference to FIG. 14.

Figure 14A:
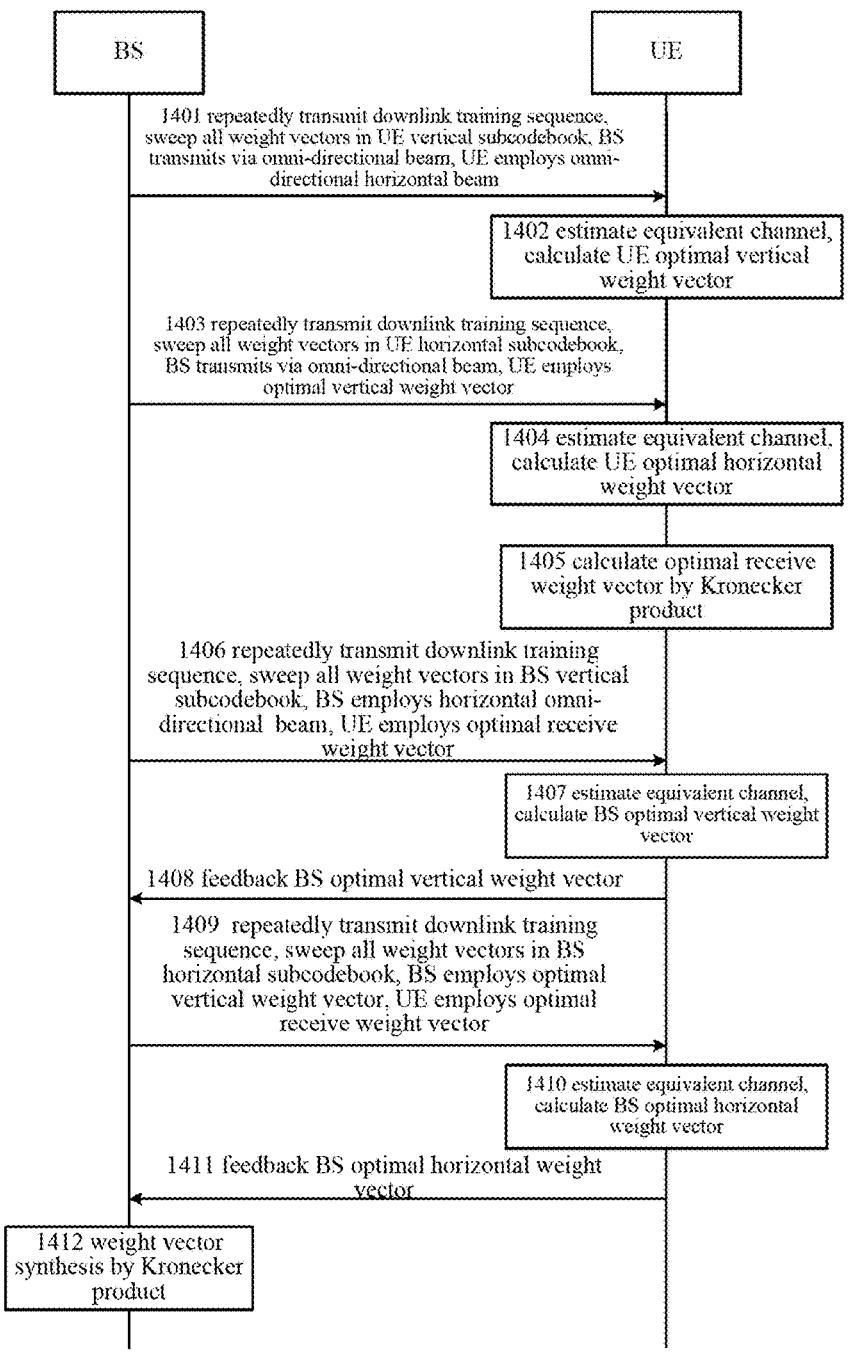
FIG. 14a shows a flow chart of beamforming training in accordance with another embodiment of the present invention.

FIG. 14*a* shows a flow diagram of beamforming training in accordance with one embodiment of the present indention, in which the receive beam sweeping of the user equipment is split into a vertical direction receive beam sweeping and a horizontal direction receive beam sweeping to be performed separately.

In step 1401, the base station repeatedly transmits the downlink training sequence by using the omnidirectional beam, and the user equipment uses the omnidirectional horizontal beam to sweep all weight vectors in the vertical sub-codebook of the user equipment. The vertical direction sub-codebook of the user equipment and the horizontal direction sub-codebook of the user equipment may be pre-stored in the memory of the user equipment, or may be obtained by the user equipment by splitting the simulation codebook pre-stored in the memory of the user equipment, or may be directly determined by the user equipment based on device parameters (e.g., antenna array size) and/or communication protocol conventions.

At step 1402, the user equipment estimates an equivalent channel based on the received training sequence and calculates an optimal vertical direction weight vector for the user equipment. The optimal vertical direction weight vector may be one of the vertical direction weight vectors in the vertical direction sub-codebook of the user equipment that makes the channel quality to be the best.

In step 1403, the base station repeatedly transmits the downlink training sequence by using the omnidirectional beam, and the user equipment sweeps all weight vectors in the horizontal sub-codebook of the user by using the optimal vertical direction weight vector determined in step 1402.

At step 1404, the user equipment estimates an equivalent channel based on the received training sequence and calculates an optimal horizontal direction weight vector for the user equipment. The optimal horizontal direction weight vector may be one of the horizontal direction weight vectors in the horizontal direction sub-codebook of the user equipment that makes the channel quality to be the best.

At step 1405, the user equipment synthesizes an optimal receive weight vector based on the optimal vertical direction weight vector and the optimal horizontal direction weight vector determined in steps 1402 and 1404 by Kronecker Product thereof, for subsequent transmission with the base station.

Steps 1406 to 1412 are completely identical to steps 903 to 909 in FIG. 9 and are not described herein.

Figure 14B:
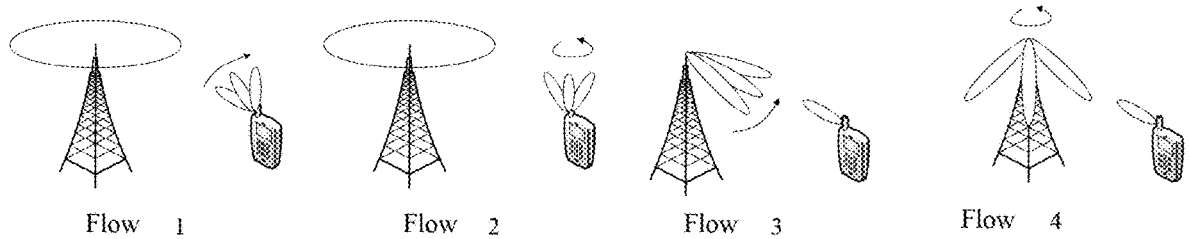
FIG. 14b shows a schematic diagram of beamforming training in accordance with another embodiment of the present invention.

FIG. 14*b* shows a schematic diagram of steps 1401 (flow 1), 1403 (flow 2), 1406 (flow 3) and 1408 (flow 4) of FIG. 14*a*. That is, the process 1 indicates that the base station uses omnidirectional beam transmission, the user equipment uses the horizontal omnidirectional beam for vertical beam sweeping, and the process 2 indicates that the base station uses omnidirectional beam transmission, and the user equipment uses the optimal vertical beam for horizontal beam sweeping; flowchart 3 indicates that the base station uses a horizontal omnidirectional beam for vertical beam sweeping, and the user equipment uses a fixed optimal receive beam; and flow 4 indicates that the base station uses the optimal vertical beam for horizontal beam sweeping, and the user equipment adopts the fixed optimal receive beam.

The above embodiment illustrates a case where the vertical beam sweeping and horizontal beam sweeping of the user equipment are completed before the vertical beam sweeping and horizontal beam sweeping of the base station. However, the specific embodiments of the present application are not limited to the above embodiments. It should be understood by those skilled in the art that the four beam sweeping processes may be performed separately in any order, or one of the two beam sweeping processes on the user equipment side may be combined with one of the two beam sweeping processes on the base station side to perform simultaneously.

In various beamforming training embodiments proposed by the present application, beam training may employ a periodic or aperiodic scheme in the periodic scheme, the base station and the user equipment can perform one beamforming training at a certain time interval. In some examples, the periods of the receive beam training of the user equipment, the horizontal direction beam training of the base station, and the vertical beam training of the base station may be different. Taking FIG. 9*b* as an example, flow 1, flow 2, and flow 3 appear in different periods, and the beams not participating in the training yet maintain the results of the previous training. As another example, since the vertical displacement of the user equipment is usually small, the time interval of the beam training in the vertical direction of the base station may be longer than that of the horizontal beam training of the base station.

In another example, the base station statistically obtains motion laws of respective user equipments through historical beam training processes or positioning information observations, and accordingly sets an appropriate training period for each user equipment, for example, a user equipment, who moves little in the vertical direction and has a small displacement, can be set a longer vertical beam training period, otherwise set a period which is the same as that of the horizontal beam training to ensure the accuracy of the training result. Thereby, the beam training period can be lengthened in a specific splitted direction, and the training overhead can be further reduced compared to the existing beam training scheme. For example, compared with the single feedback mechanism in two T cycles, the number of weight vector combinations that need to be detected by the single feedback mechanism is 2*(P+Q), where P and Q are sizes of the base station codebook and the user equipment codebook respectively, while in the case where the base station codebook can be decomposed, P=W*H, the complexity of the training method with asymmetric periods can be as low as 2W+H+2Q. On the other hand, it can be understood that the present disclosure also supports shortening the beam training period in a specific splitted direction, such as horizontal direction, although compared to the existing beam training scheme, the training overhead is similar or limitedly increase, but the beam training accuracy can be significantly improved.

In the aperiodic scheme, the user initiates a beamforming training request, and the base station performs beamforming training after processing the user request. Alternatively, the base station actively initiates a beamforming training request, and configures the user equipment to perform beamforming training.

According to an embodiment, a request for receive beam training of the user equipment, horizontal beam training of the base station, and vertical direction beam training of the base station may also be initiated individually or periodically. The case of individual beamforming training may occur in certain special scenarios, such as when the user moves in a single direction, such as when the user is traveling in an elevator, moving in a vertical direction, then a request to individually train the vertical direction beam may be initiated.

Furthermore, in the above description, the first direction beamforming performed by the first communication device (e.g., the base station) uses all of the first direction sub-codebooks, and/or all second direction sub-codebooks are used in the second direction beamforming. However, according to an embodiment, the first direction beamforming and the second direction beamforming may use a part of the first direction sub-codebook and the second direction sub-codebook, respectively. This can occur in a case where, for example, the approximate location of the user, such as the approximate horizontal direction range and/or the approximate vertical direction range, has been known by pre-processing prior to beamforming, wherein in training, a part of the horizontal direction codebook corresponding to such a horizontal direction range and/or a part of the vertical direction codebook corresponding to such a vertical direction range can be used for beamforming training.

According to an embodiment, the plurality of sets of first sub-configuration parameters and the plurality of sets of second sub-configuration parameters each are sub-configuration parameters within a predetermined range, wherein the predetermined range is at least a part of the range of all available sub-configuration parameters.

Moreover, according to an embodiment, the omnidirectional beam, the omnidirectional horizontal beam, and the omnidirectional vertical beam described above may also be replaced with other beams. This situation may occur, but is not limited to a case where the base station has known the approximate location of the user equipment and a wide beam, instead of an omnidirectional beam, is used for training. The wide beam here may mean that the gain of the beam is concentrated in a wide range of all possible values of the horizontal and vertical angles of arrival. As an improved example, for example, according to a user's rough orientation (e.g., obtained by existing positioning scheme, such as direction angle of arrival estimation, LBS, etc., or GPS information), the base station may transmit a wide beam in a corresponding direction to provide a certain beamforming gain so as to assist the user equipment in the receive beam sweeping.

The beamforming training mechanism of the present application can also be extended to a multi-user millimeter wave system. Taking a multi-user millimeter-wave system in a hybrid precoding architecture as an example, each RF chain serves one user equipment, and beamforming training between the RF chain and a corresponding user equipment can proceed by utilizing the flows as illustrated in FIGS. 9a, 10a, 11, 12a, 13a, and 14a. However, when multiple RF chains and multiple user equipments perform training at the same time, the training sequences transmitted by different radio frequency chains should be orthogonal to each other so that the multiple user equipments can distinguish signals for themselves. Taking the step 901 of FIG. 9 as an example, it is assumed that the base station adopts a sub-connection hybrid precoding architecture, is equipped with K radio frequency chains, and serves K user equipments at the same time $H_{i,j}$ represents a channel matrix between the i-th radio frequency chain and the jth user, $\{\phi_1, \phi_2, \ldots, \phi_K\}$ represents an orthogonal sequence used by the K radio frequency chains $$y_k = \sum_{i=1}^{K} w_k^T H_{i,k} f_{omni} \phi_i + n_k$$

Where $y_k$ represents the receive signal of the kth user equipment, $n_k$ represents the noise of the kth user equipment, $f_{omni}$ indicates that the base station uses omnidirectional beam transmission, and $w_k$ represents the receive weight vector of the kth user equipment.

In step 902, the kth user equipment can obtain a channel quality estimate by using a least squares algorithm:

$$w_k^T H_{k,k} f_{omni} = \frac{y_k \phi_k^T}{\phi_k \phi_k^T}$$

That is, the kth user equipment makes channel estimation by multiplying the receive channel by the transpose of a training sequence of the kth radio frequency chain used for the kth user equipment. Correspondingly, for the k-th user equipment, the beam training criterion can be expressed as:

$$\{w_{k,opt}\} = \arg \max |w_k^T H_{k,k} f_{omni}| s.t. w_k \in W$$

Where $w_{k,opt}$ represents the trained optimal receive weight vector of the user equipment, and W represents the simulation receive codebook.

All other steps can be extended to a multi-user millimeter wave system using the same approach.

Figure 15:
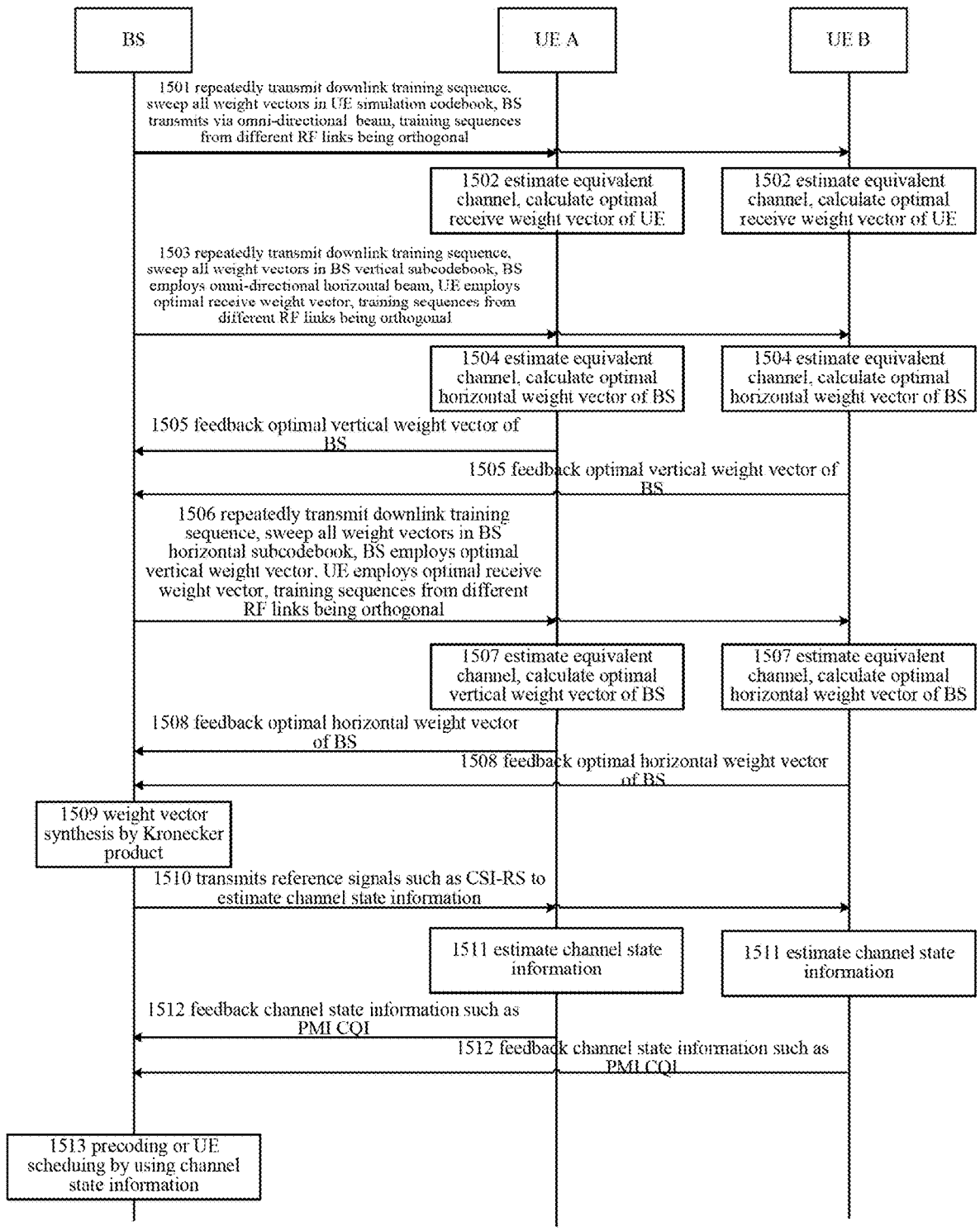
FIG. 15 shows a flow chart of beamforming training in a main-user millimeter wave system.

FIG. 15 is a flow chart showing extension of the beamforming training flow shown in FIG. 9a to a multi-user millimeter wave system in accordance with one embodiment of the present invention. Steps 1501 to 1509 are basically the same as steps 901 to 909 in FIG. 9a. The difference is that the base station has multiple radio frequency chains for multiple user equipments, and each radio frequency chain transmits training sequences orthogonal to each other. After receiving the signal sent by the base station, the user equipment processes the received signal based on the corresponding training sequence and then performs channel estimation. The base station can transmit training sequences to multiple user equipments through respective radio frequency chains simultaneously. When the multiple user equipments make channel estimation and subsequently feedback optimal weight vectors to the base station, various known collision avoidance mechanisms in the existing communication technologies may be used to ensure that respective feedback signals do not interfere with each other. In one example, user equipment feedbacks an index of the optimal weight vector on its own dedicated physical uplink control channel. In another example, the user equipment makes the feedback in a form of, for example, bitmap in the MAC layer or higher layer, each bit representing a weight vector, 1 indicating that the corresponding bit indicates the optimal weight vector, and the others are represented by 0. Compared with the existing beamforming scheme, the present invention only needs to use a small number of bits which enable to feedback optimal weight vectors in the horizontal and vertical directions respectively every time, and can avoid modification of the existing signaling structure. And it can also save limited signaling resources in some scenarios.

The beamforming mechanism proposed by the present invention can also be used in combination with a channel state estimation mechanism. For example, in FIG. 15, after the step 1509 in which an optimal transmit weight vector of the base station can be calculated by Kronecker Product of the optimal vertical direction vector and the optimal horizontal direction weight vector, in step 1510, the base station can estimate channel state information by utilizing the optimal transmit weight vector obtained in the step 1509 to transmit a reference signal such as a Channel State Information Reference Signal (CSI-RS), etc.

In step 1511, each user equipment estimates channel state information based on the received reference signal. In step 1512, each user feedbacks the channel state information such as a Preceding Matrix Indicator (PMI), a Channel Quality Indicator (CQI), and the like to the base station. In step 1513, the base station performs digital preceding using channel state information fedback by each user to multiplex transmission resources, while controlling interference between user equipments or determining a modulation coding scheme or the like for user scheduling.

In order to further illustrate the invention, a more specific embodiment is given below.

Consider a single-cell multi-user millimeter-wave large-scale antenna system. The base station uses an analog-digital hybrid preceding architecture to serve K users simultaneously, and the base station is equipped with K RF chains. The base station is equipped with a UPA antenna array, and the number of antennas is M=W×H, where W is the number of antennas in the width direction of the antenna array, and H is the number of antennas in the height direction of the antenna array. The UE uses an ULA antenna array. Both the base station end and the user end use the classical DFT beamforming codebook design scheme, and the codebook is determined by the following codebook matrix.

$$[C]_{i,m} = j^{\left|\frac{i \times (im + N_c/2) mod N_c}{N_c/4}\right|}, 1 \leq i \leq N_a, 1 \leq m \leq N_c$$

Here, $N_a$ represents the number of antennas, and $N_c$ represents the size of the codebook, and it is assumed here that the codebook size is equal to the number of antennas. Note that, since the base station uses the planar antenna array, the beamforming codebook is generated by Kronecker Product of the horizontal sub-codebook and the vertical sub-codebook, and the horizontal sub-codebook and the vertical sub-codebook are DFT codebook as described above. The specific system simulation parameters are shown in the following table:

TABLE 1 specific simulation parameters

|  | Single user scenario | Multi-user scenario (sub-connection) |
|---|---|---|
| Number of antennas at the base station: M = W × H | 64, 8 × 8 UPA | 256, 16 × 16 UPA (splitted into four 8×8 subarray for serving for users) |
| Number of antennas at the user end: N | 4, ULA | 4, ULA |
| Number of users in a cell K | 1 | 4 |
| Length of a training sequence τ | 4 | 4 |
| Channel parameters $\{N_{cl}, N_{ray}\}$ | {3, 8} | {3, 8} |
| Extended standard deviation for channel angles | 8° | 8° |

Considering the traditional exhaustive search mechanism, the overhead of beamforming training is MN OFDM symbols. The beamforming training overhead of the single feedback search mechanism is M+N OFDM symbols. In our proposed mechanism of performing the beamforming training based on the first direction and the second direction separately, the training overhead can be reduced. For example, the overhead of the beamforming training mechanism of FIG. 9 is W+H+N OFDM symbols, and the overhead of the beamforming training mechanism of FIG. 12 and FIG. 13 is H+W×N or W+H×N, respectively, OFDM symbols. The details are shown in the table below.

TABLE 2 comparison of training overheads of different beamforming training

| Training mechanism | Training overhead |
|---|---|
| Exhaustive search | MN = 256 |
| Single feedback | M + N = 68 |
| Mechanism shown in FIG. 9 | W + H + N = 20 |
| Mechanism shown in FIG. 12 | H + W × N = 40 |
| Mechanism shown in FIG. 13 | W + H × N = 40 |

In order to verify the performance of our proposed beamforming training mechanisms, the average user achievable rate is simulated below for consideration of five schemes: (1) exhaustive search mechanism; (2) single feedback search mechanism; (3) The mechanism shown in FIG. 9; (4) the mechanism shown in FIG. 12; (5) the mechanism shown in FIG. 13.

Figure 16:
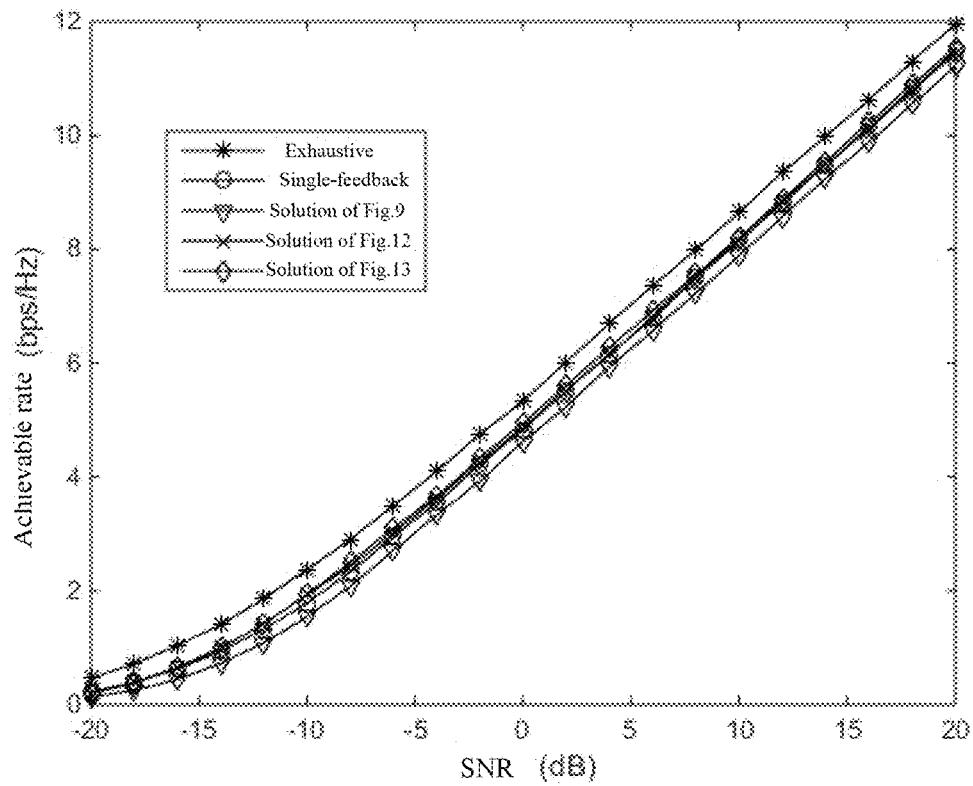
FIG. 16 shows a graph of user average achievable rate versus signal to noise ratio in accordance with one embodiment of the present application.

FIG. 16 shows the simulation of user achievable rates of respective beam training mechanisms in a single-user scenario. It can be seen that the performance loss of the mechanism shown in FIG. 9 is small (about 1 dB) compared to the traditional single feedback mechanism. However, the training overhead is reduced from 68 time slots to 20 time slots, which is reduced by about 70%. In addition, the performances of the mechanism shown in FIG. 12 and the mechanism shown in FIG. 13 are close to that of the single feedback mechanism, but the training overhead is also reduced by about 40%. It is proved that the proposed beamforming training mechanism can greatly reduce the training overhead while achieving good performance.

Figure 17:
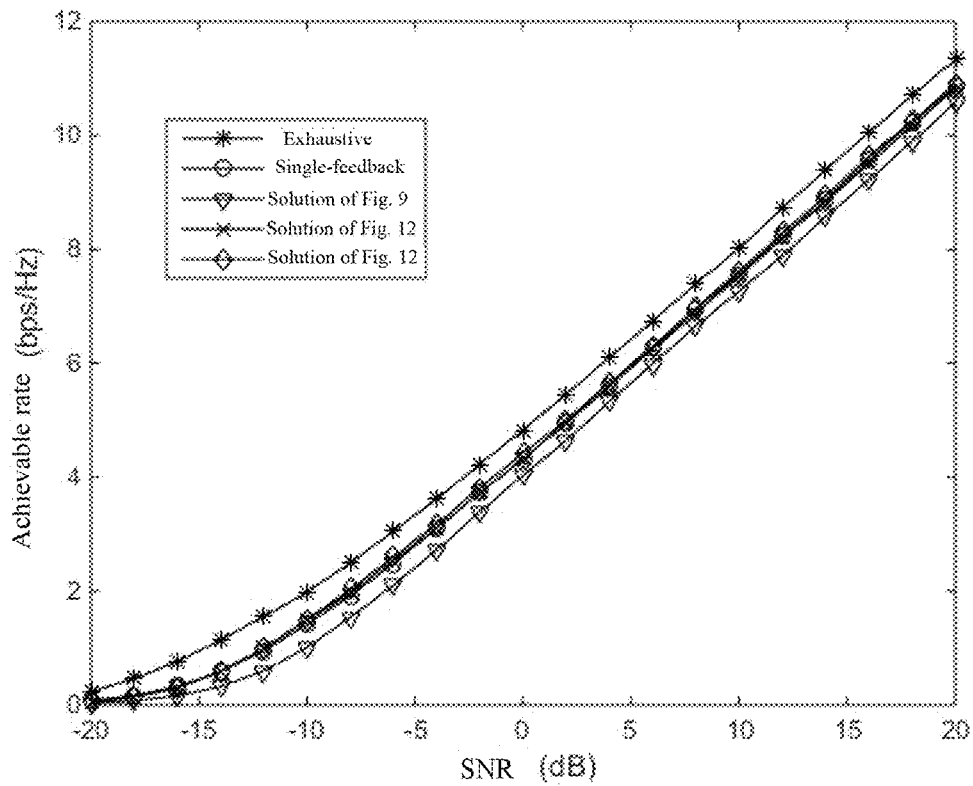
FIG. 17 shows a graph of user average achievable rate versus signal to noise ratio in accordance with one embodiment of the present application.

FIG. 17 shows the simulation of average user achievable rates of respective beam training mechanisms in a multi-user scenario. Similar to the single-user scenario, it can be seen that the proposed beamforming training mechanism can greatly reduce the training overhead while achieving good performance.

APPLICATION EXAMPLE

The technique of the present disclosure can be applied to various products. For example, the BS may be implemented as any type of evolved Node B (eNB), such as a macro eNB and a small eNB. A small eNB may be an eNB that covers cells smaller than the macro cells, such as a pico eNB, a micro eNB, or a home (femto) eNB. Alternatively, the BS may be implemented as any other type of BS, such as a NodeB and a Base Transceiver Station (BTS). The BS may comprise: a main unit that is configured to control wireless communication, also referred to as a BS device, such as the electronic devices 700 and 710 as described in the present application; and one or more remote wireless headends (RRHs) that are located in different locations from the main unit. In addition, various types of terminals described below may operate as a BS by temporarily or semi-permanently performing the functions of a BS.

For example, the UE may be implemented as a mobile terminal such as a smart phone, a tablet personal computer (PC), a notebook PC, a portable game terminal, a portable/dongle type mobile router, and a digital camera, or an on-board terminal such as a car navigation device. The UE may also be implemented as a terminal performing machine-to-machine (M2M) communication, also referred to as a machine type communication (MTC) terminal. In addition, the UE may be a wireless communication module installed on each of the aforementioned terminals, such as an integrated circuit module including a single wafer, such as the electronic devices 700 and 710 as described in the present application.

Figure 18:
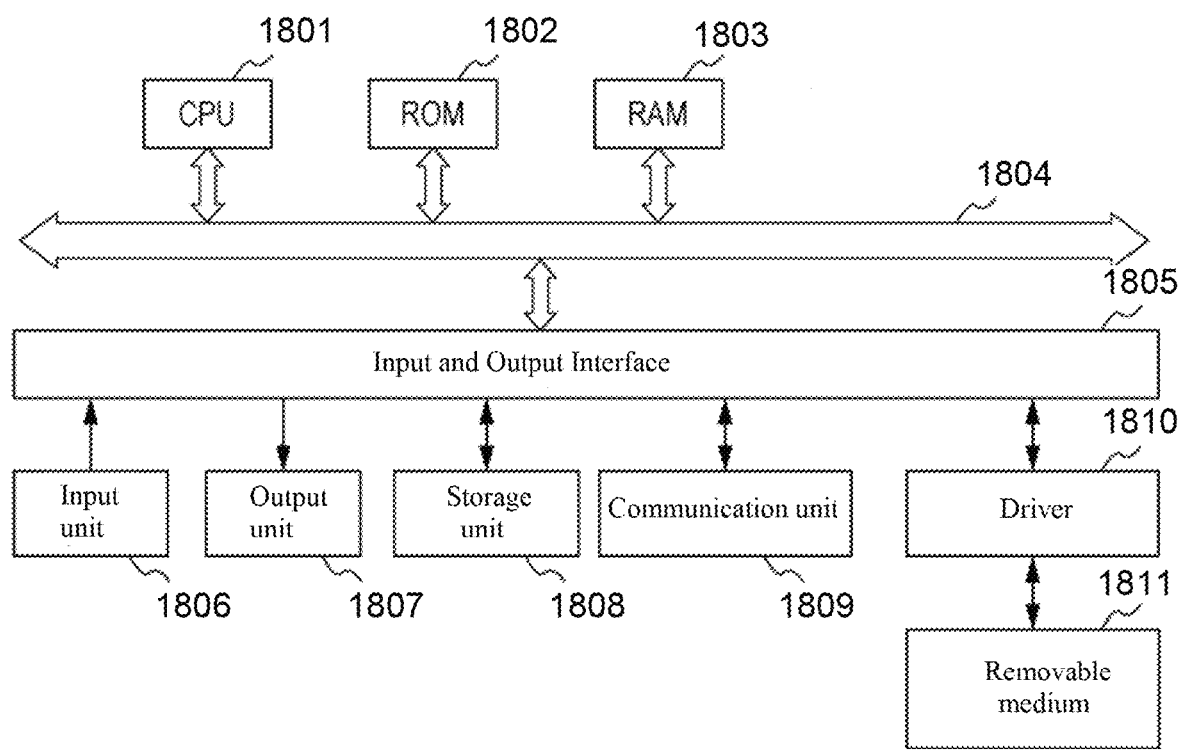
FIG. 18 shows an example of a hardware configuration of an electronic device according to the present invention.

FIG. 18 shows an example of a hardware configuration of an electronic device according to the present invention.

The central processing unit (CPU) 2301 functions as a data processing unit that performs various types of processing based on programs stored on a read only memory (ROM) 1802 or a storage unit 1808. For example, the CPU 1801 performs processing based on the aforementioned sequence. A random access memory (RAM) 1803 stores programs, data, and the like executed by the CPU 1801. The CPU 1801, the ROM 1802, and the RAM 1803 are connected to each other via a bus 1804.

The CPU 1801 is connected to the input and output interface 1805 via a bus 1804, and an input unit 1806 composed of various switches, a keyboard, a mouse, a microphone, and the like, and an output unit 1807 composed of a display, a speaker, and the like are connected to the input and output interface 1805. For example, the CPU 1801 executes various types of processing in response to an instruction input from the input unit 1806, and outputs the processing result to the output unit 1807.

The storage unit 1808 connected to the input and output interface 1805 is constituted by, for example, a hard disk, and stores thereon programs and various types of data executed by the CPU 1801. The communication unit 1809 communicates with an external device via a network such as the Internet or a local area network.

The drive 1810 connected to the input and output interface 1805 drives a removable medium 1811 such as a magnetic disk, an optical disk, a magneto-optical disk, or a semiconductor memory (for example, a memory card), and acquires each of the contents such as content and key information recorded thereon. Class data. For example, by using the acquired content and key data, the CPU 1801 performs processing such as beamforming training for wireless communication based on the reproduction program.

The methods and systems of the present invention may be implemented in a number of ways. For example, the methods and systems of the present invention can be implemented in software, hardware, firmware, or any combination of software, hardware, and firmware. The above-described sequence of steps for the method is for illustrative purposes only, and the steps of the method of the present invention are not limited to the order specifically described above unless otherwise specifically stated. Moreover, in some embodiments, the invention may also be embodied as a program recorded in a recording medium, the program comprising machine readable instructions for implementing the method according to the invention. Thus, the invention also covers a recording medium storing a program for performing the method according to the invention.

Heretofore, the beamforming method and the electronic device for the base station and the user equipment according to the present invention have been described in detail. In order to avoid obscuring the inventive concept, some details known in the art are not described. Those skilled in the art can fully understand how to implement the technical solutions disclosed herein according to the above description.

The methods and systems of the present invention may be implemented in a number of ways. For example, the methods and systems of the present invention can be implemented in software, hardware, firmware, or any combination of software, hardware, and firmware. The above-described sequence of steps for the method for illustrative purposes only, and the steps of the method of the present invention are not limited to the order specifically described above unless otherwise specifically stated. Moreover, in some embodiments, the invention may also be embodied as a program recorded in a recording medium, the program comprising machine readable instructions for implementing the method according to the invention. Thus, the invention also covers a recording medium storing a program for performing the method according to the invention.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

What is claimed is:

1. An electronic device for a first communication device of a wireless communication system, wherein the first communication device is equipped with a plurality of antennas, and the electronic device comprises:
   a processing circuit configured to:
   configure a first transmission from the first communication device to each one of a plurality of second communication devices, based on a plurality of sets of first sub-configuration parameters separately for each second communication device, respectively, so that a specific set of first sub-configuration parameters are determined to cause communication channel quality of the first transmission to be optimal, based on information related to the first transmission, wherein the plurality of sets of first sub-configuration parameters are associated with a first direction with respect to a plane in which the plurality of antennas are located;
   configure a second transmission from the first communication device to the each one of the plurality of second communication devices, based on a plurality of sets of second sub-configuration parameters separately for each second communication device, respectively, so that a specific set of second sub-configuration parameters are determined to cause communication channel quality of the second transmission to be optimal, based on information related to the second transmission, wherein the plurality of sets of second sub-configuration parameters are associated with a second direction with respect to the plane, the second direction being orthogonal to the first direction;
   configure a subsequent transmission from the first communication device to the each one of the plurality of second communication devices, based on a specific set of first configuration parameters which are determined by combining the specific set of first sub-configuration parameters and the specific set of second sub-configuration parameters, the specific set of first configuration parameters being set as optimal parameters for the subsequent transmission, respectively;
   configure a third transmission transmitting reference signal, by utilizing the specific set of first configuration parameters, to each of the plurality of second communication devices; and
   control multi-user scheduling based on channel state information, the channel state information being estimated by each of the plurality of second communication devices, respectively, in response to the reference signal from the first communication device,
   wherein when the plurality of antennas are arranged in a triangular planar antenna array, the processing circuit is configured to obtain beams in the vertical direction and beams in the horizontal direction, respectively, perform beam training in the vertical direction and the horizontal direction respectively to obtain the direction of a specific user equipment, and perform specific combination of training results in the vertical direction and training results in the horizontal directions to obtain a weight vector for the triangular planar antenna array for configuring actual transmission.

2. The electronic device according to claim 1,
   wherein each set of the plurality of sets of first sub-configuration parameters is used for configuring phase values of a plurality of phase shifters in a set of phase shifters corresponding to the plurality of antennas one by one, and/or
   wherein each set of the plurality of sets of second sub-configuration parameters is used for configuring phase values of a plurality of phase shifters in the set of phase shifters, and/or
   wherein the specific set of first configuration parameters configure phase value of each phase shifter in the set of phase shifters.

3. The electronic device according to claim 1,
   wherein the information related to the first transmission indicates communication channel quality of the first transmission, wherein the specific set of first sub-configuration parameters are a set of first sub-configuration parameters causing the communication channel quality of the first transmission to be optimal; and/or
   wherein the information related to the second transmission indicates communication channel quality of the second transmission, and wherein the specific set of second sub-configuration parameters are a set of second sub-configuration parameters causing the communication channel quality of the second transmission to be optimal.

4. The electronic device according to claim 1,
wherein the information related to the first transmission indicates a set of first sub-configuration parameters causing the communication channel quality of the first transmission to be optimal or indexes thereof; and/or
wherein the information related to the second transmission indicates a set of second sub-configuration parameters causing the communication channel quality of the second transmission to be optimal or indexes thereof.

5. The electronic device according to claim 1, wherein configuring the first transmission based on a plurality of sets of first sub-configuration parameters separately comprises:
configuring the first transmission based on the plurality of first sub-configuration parameters and a predetermined set of second sub-configuration parameters.

6. The electronic device according to claim 1, wherein configuring the second transmission based on a plurality of sets of second sub-configuration parameters separately comprises:
configuring the second transmission based on the specific set of first sub-configuration parameters and a plurality of sets of second sub-configuration parameters.

7. The electronic device according to claim 1, wherein the plurality of sets of first sub-configuration parameters and the plurality of sets of second sub-configuration parameters are stored in a storage of the first communication device in advance, and are derived from a plurality of sets of first configuration parameters stored in a storage of the first communication device in advance.

8. The electronic device according to claim 1, wherein the electronic device operates as the first communication device, the first communication device further comprising a radio frequency chain and a set of phase shifters corresponding to the plurality of antennas one by one, wherein the set of phase shifters are disposed between the radio frequency chain and the plurality of antennas, and wherein the processing circuit of the electronic device configures phase values of the set of phase shifters based on the specific set of first configuration parameters.

9. The electronic device according to claim 1, wherein the each of the plurality of second communication devices is configured to receive signal transmission from the first communication device by a plurality of sets of second configuration parameters, and wherein a specific set of second configuration parameters for configuring the each of the plurality of second communication devices are determined based on information related to the signal transmission.

10. The electronic device according to claim 1, wherein the first communication device comprises a plurality of radio frequency chains each being coupled with a set of phase shifters, and wherein the first communication device further comprises a digital precoder being coupled with the plurality of radio frequency chains, and
wherein the processing circuit is further configured to generate a digital precoding matrix based on channel status information between the plurality of second communication devices so that the digital precoder performs digital precoding for data signals for the plurality of second communication devices.

11. The electronic device according to claim 1, wherein the first and second transmission is initiated by the first communication device at periodic time intervals and
wherein the time interval for the first transmission are different from the time interval for the second transmission; or
wherein the first and second transmission are initiated by a non-periodic request from the each of the plurality of second communication devices and
wherein the first and second transmission is individually initiated by a request from the each of the plurality of second communication devices.

12. The electronic device according to claim 9, wherein the information related to the signal transmission indicates communication channel quality of the signal transmission, and wherein the specific set of second configuration parameters are a set of second configuration parameters causing the communication channel quality of the signal transmission to be optimal.

13. The electronic device according to claim 12, wherein the signal transmission is before the first and second transmission, and the first communication device configures the signal transmission based on a predetermined set of first configuration parameters.

14. The electronic device according to claim 12, wherein the signal transmission is after the first and second transmission, and the first communication device configures the signal transmission based on the specific set of first sub-configuration parameters and the specific set of second sub-configuration parameters.

15. The electronic device according to claim 12, wherein the signal transmission is between the first and second transmission, and the first communication device configures the signal transmission based on the specific set of first sub-configuration parameters and a predetermined set of second sub-configuration parameters.

16. The electronic device according to claim 12, wherein the signal transmission is the first transmission, and the specific set of second configuration parameters are determined by:
when the first communication device configures the first transmission by each set of the plurality of sets of first sub-configuration parameters and the each of the plurality of second communication devices successively receives the first transmission by each set of the plurality of sets of second configuration parameters, selecting a set of second configuration parameters causing communication channel quality of a corresponding first transmission to be optimal as the specific set of second configuration parameters; or
wherein the signal transmission is the second transmission, and the specific set of second configuration parameters are determined by:
when the first communication device configures the second transmission by each set of the plurality of sets of second sub-configuration parameters and the each of the plurality of second communication devices successively receives the second transmission by each set of the plurality of sets of second configuration parameters, selecting a set of second configuration parameters causing communication channel quality of a corresponding second transmission to be optimal as the specific set of second configuration parameters.

17. The electronic device according to claim 12, wherein the specific set of second configuration parameters for the each of the plurality of second communication devices are derived from a specific set of third sub-configuration parameters and a specific set of fourth sub-configuration parameters, wherein the set of third sub-configuration parameters and the set of fourth sub-configuration parameters are associated with a third and fourth direction with respect to a plane in which a plurality of antennas of the each of the plurality of second communication devices are located respectively, the third direction being orthogonal to the fourth direction, and wherein the specific set of third sub-configuration parameters are determined by the each of the plurality of second communication devices receiving signal transmission from the first communication device based on a plurality of sets of third sub-configuration parameters and determining a set of third sub-configuration parameters causing communication channel quality of the signal transmission to be optimal, and wherein the specific set of fourth sub-configuration parameters are determined by the each of the plurality of second communication devices receiving signal transmission from the first communication device based on the determined set of the third sub-configuration parameters and a plurality of sets of fourth sub-configuration parameters and determining a set of fourth sub-configuration parameters causing communication channel quality of the signal transmission to be optimal.

18. An electronic device for a second communication device of a wireless communication system; the electronic device comprising:

a processing circuit configured to:

acquire information related to a first transmission configured by a first communication device based on a plurality of sets of first sub-configuration parameters separately, wherein the plurality of sets of first sub-configuration parameters are associated with a first direction with respect to plane in which the plurality of antennas are located; and acquire information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction; and wherein, by combining a specific set of first sub-configuration parameters determined to cause communication channel quality of the first transmission to be optimal based on information related to the first transmission and a specific set of second sub-configuration parameters determined to cause communication channel quality of the second transmission to be optimal based on information related to the second transmission, a specific set of first configuration parameters configuring a subsequent transmission from the first communication device to the second communication device is determined, the specific set of first configuration parameters being set as optimal parameters for the subsequent transmission, wherein, the processing circuit is configured to receive reference signal from the first communication device, the reference signal being generated by utilizing the specific set of first configuration parameters, wherein, the processing circuit is configured to transmit channel state information for multi-user scheduling, the channel state information being estimated in response to the reference signal, and wherein when the plurality of antennas are arranged in a triangular planar antenna array, the first communication device is configured to obtain beams in the vertical direction and beams in the horizontal direction respectively, perform beam training in the vertical direction and the horizontal direction respectively to obtain the direction of a specific user equipment and perform specific combination of training results in the vertical direction and training results in the horizontal directions to obtain a weight vector for the triangular planar antenna array for configuring actual transmission.

19. A method for a wireless communication system, wherein the wireless communication system comprises a first communication device and a second communication device, and the first communication device is equipped with a plurality of antennas, the method comprising:

configuring a first transmission from the first communication device to each one of a plurality of second communication devices, based on a plurality of sets of first sub-configuration parameters separately for each second communication device, respectively, so that a specific set of first sub-configuration parameters are determined to cause communication channel quality of the first transmission to be optimal, based on information related to the first transmission, wherein the plurality of sets of first sub-configuration parameters are associated with a first direction with respect to a plane in which the plurality of antennas are located;

configuring a second transmission from the first communication device to the each one of the plurality of second communication devices, based on a plurality of sets of second sub-configuration parameters separately for each second communication device, respectively, so that a specific set of second sub-configuration parameters are determined to cause communication channel quality of the second transmission to be optimal, based on information related to the second transmission, wherein the plurality of sets of second sub-configuration parameters are associated with a second direction with respect to the plane, the second direction being orthogonal to the first direction;

configuring a subsequent transmission from the first communication device to the each one of the plurality of second communication devices, based on a specific set of first configuration parameters which are determined by combining the specific set of first sub-configuration parameters and the specific set of second sub-configuration parameters, the specific set of first configuration parameters being set as optimal parameters for the subsequent transmission, respectively;

configuring a third transmission transmitting reference signal, by utilizing the specific set of first configuration parameters, to each of the plurality of second communication device; and controlling multi-user scheduling based on channel state information, the channel state information being estimated by each of the plurality of second communication devices, respectively, in response to the reference signal from the first communication device, wherein when the plurality of antennas are arranged in a triangular planar antenna array obtaining beams in the vertical direction and beams in the horizontal direction, respectively, performing beam training in the vertical direction and the horizontal direction respectively to obtain the direction of a specific user equipment, and performing specific combination of training results in the vertical direction and training results in the horizontal directions to obtain a weight vector for the triangular planar antenna array for configuring actual transmission.

20. A method for a wireless communication system, wherein the wireless communication system comprises a first communication device and a second communication device, and the first communication device is equipped with a plurality of antennas, the method comprising:

acquiring information related to a first transmission configured by the first communication device based on a plurality of sets of first sub-configuration parameters separately, wherein the plurality of sets of first sub-configuration parameters are associated with a first direction with respect to plane in which the plurality of antennas are located; and acquiring information related to a second transmission configured by the first communication device based on a plurality of sets of second sub-configuration parameters separately, wherein the plurality of sets of second sub-configuration parameters are associated with a second direction with respect to the plane, the second direction being orthogonal to the first direction; and wherein, by combining a specific set of first sub-configuration parameters determined to cause communication channel quality of the first transmission to be optimal based on information related to the first transmission and a specific set of second sub-configuration parameters determined to cause communication channel quality of the second transmission to be optimal based on information related to the second transmission, a specific set of first configuration parameters configuring a subsequent transmission from the first communication device to the second communication device is determined, the specific set of first configuration parameters being set as optimal parameters for the subsequent transmission, wherein, receiving reference signal from the first communication device, the reference signal being generated by utilizing the specific set of first configuration parameters, and wherein, transmitting channel state information for multi-user scheduling, the channel state information being estimated in response to the reference signal, wherein when the plurality of antennas are arranged in a triangular planar antenna array, the first communication device is configured to obtain beams in the vertical direction and beams in the horizontal direction respectively, perform beam training in the vertical direction and the horizontal direction respectively to obtain the direction of a specific user equipment and perform specific combination of training results in the vertical direction and training results in the horizontal directions to obtain a weight vector for the triangular planar antenna array for configuring actual transmission.

* * * * *